(12) United States Patent
Vine et al.

(10) Patent No.: US 12,066,073 B2
(45) Date of Patent: *Aug. 20, 2024

(54) ELECTROMECHANICAL SPRING SYSTEM

(71) Applicant: Barnes Group Inc., Bristol, CT (US)

(72) Inventors: Adrian A. Vine, Holland, OH (US); Robert D. Thompson, Ann Arbor, MI (US); Steven F. Rockow, Bristol, CT (US); Christopher T. Reynard, Swanton, OH (US); Jack W. Adoline, Bristol, CT (US); Phillip A. McConnell, Bristol, CT (US)

(73) Assignee: BARNES GROUP INC., Bristol, CT (US)

( * ) Notice: Subject to any disclaimer, the term of this patent is extended or adjusted under 35 U.S.C. 154(b) by 887 days.

This patent is subject to a terminal disclaimer.

(21) Appl. No.: 16/897,861

(22) Filed: Jun. 10, 2020

(65) Prior Publication Data

US 2020/0300325 A1    Sep. 24, 2020

Related U.S. Application Data

(63) Continuation-in-part of application No. 14/850,134, filed on Sep. 10, 2015, now Pat. No. 10,935,096.

(Continued)

(51) Int. Cl.
| | |
|---|---|
| F16H 29/20 | (2006.01) |
| F16F 1/04 | (2006.01) |
| F16H 25/20 | (2006.01) |
| G05B 19/042 | (2006.01) |
| G05D 15/01 | (2006.01) |
| H04L 67/125 | (2022.01) |
| G16Y 20/20 | (2020.01) |
| G16Y 40/30 | (2020.01) |

(52) U.S. Cl.
CPC ......... *F16F 1/041* (2013.01); *F16H 25/2021* (2013.01); *G05B 19/0426* (2013.01); *G05D 15/01* (2013.01); *H04L 67/125* (2013.01); *F16F 2228/08* (2013.01); *F16F 2230/0023* (2013.01); *F16F 2230/0047* (2013.01); *F16F 2230/18* (2013.01); *F16F 2232/08* (2013.01); *F16H 2025/2046* (2013.01); *F16H 2025/2071* (2013.01); *F16H 2025/2081* (2013.01); *G05B 2219/25065* (2013.01); *G16Y 20/20* (2020.01); *G16Y 40/30* (2020.01)

(58) Field of Classification Search
CPC .. F16H 1/121; F16H 25/20; F16H 2025/2065; F16H 2025/2071; F16H 2025/2081; F16H 2025/31
See application file for complete search history.

(56) References Cited

U.S. PATENT DOCUMENTS

| | | |
|---|---|---|
| 4,712,441 A | 12/1987 | Abraham |
| 4,858,481 A | 8/1989 | Abraham |

(Continued)

FOREIGN PATENT DOCUMENTS

| | | |
|---|---|---|
| DE | 102005030052 | 12/2006 |
| EP | 1840310 | 10/2007 |

(Continued)

*Primary Examiner* — Nicholas J Lane
(74) *Attorney, Agent, or Firm* — CANTOR COLBURN LLP

(57) ABSTRACT

A spring system that includes an adjustable spring system that is operated by a motor.

9 Claims, 10 Drawing Sheets

Related U.S. Application Data

(60) Provisional application No. 62/052,554, filed on Sep. 19, 2014.

(56) References Cited

U.S. PATENT DOCUMENTS

| | | | |
|---|---|---|---|
| 5,090,513 | A | 2/1992 | Bussinger |
| 5,195,721 | A | 3/1993 | Akkerman |
| 5,755,059 | A * | 5/1998 | Schap ................. B60J 5/06 49/362 |
| 6,234,034 | B1 | 5/2001 | Ando |
| 6,516,567 | B1 * | 2/2003 | Stone ................ E05F 15/622 49/343 |
| 7,938,473 | B2 | 5/2011 | Paton et al. |
| 2005/0252318 | A1 * | 11/2005 | Corney ............. F16H 25/2021 74/89.38 |
| 2007/0062119 | A1 | 3/2007 | Ritter |
| 2009/0058020 | A1 | 3/2009 | Ersoy et al. |
| 2009/0288511 | A1 | 11/2009 | Kuribayashi et al. |
| 2010/0186528 | A1 | 7/2010 | Hillen et al. |
| 2010/0222096 | A1 * | 9/2010 | Griffin ................ H04M 19/04 455/550.1 |
| 2013/0300044 | A1 | 11/2013 | Adoline et al. |
| 2015/0377329 | A1 | 12/2015 | Wu |
| 2017/0081895 | A1 | 3/2017 | Osafune et al. |
| 2017/0102057 | A1 * | 4/2017 | Aubin-Marchand .... H02K 7/06 |
| 2017/0226789 | A1 * | 8/2017 | Link ..................... F16H 25/20 |
| 2018/0100523 | A1 | 4/2018 | Fenn et al. |
| 2018/0333842 | A1 * | 11/2018 | McEntee ............ F16H 25/2204 |
| 2019/0048988 | A1 * | 2/2019 | Besser ............... F16H 25/2015 |
| 2020/0200243 | A1 * | 6/2020 | Carlson .................. B60P 3/34 |

FOREIGN PATENT DOCUMENTS

| | | |
|---|---|---|
| EP | 2604454 | 6/2013 |
| WO | 2012040831 | 4/2012 |

* cited by examiner

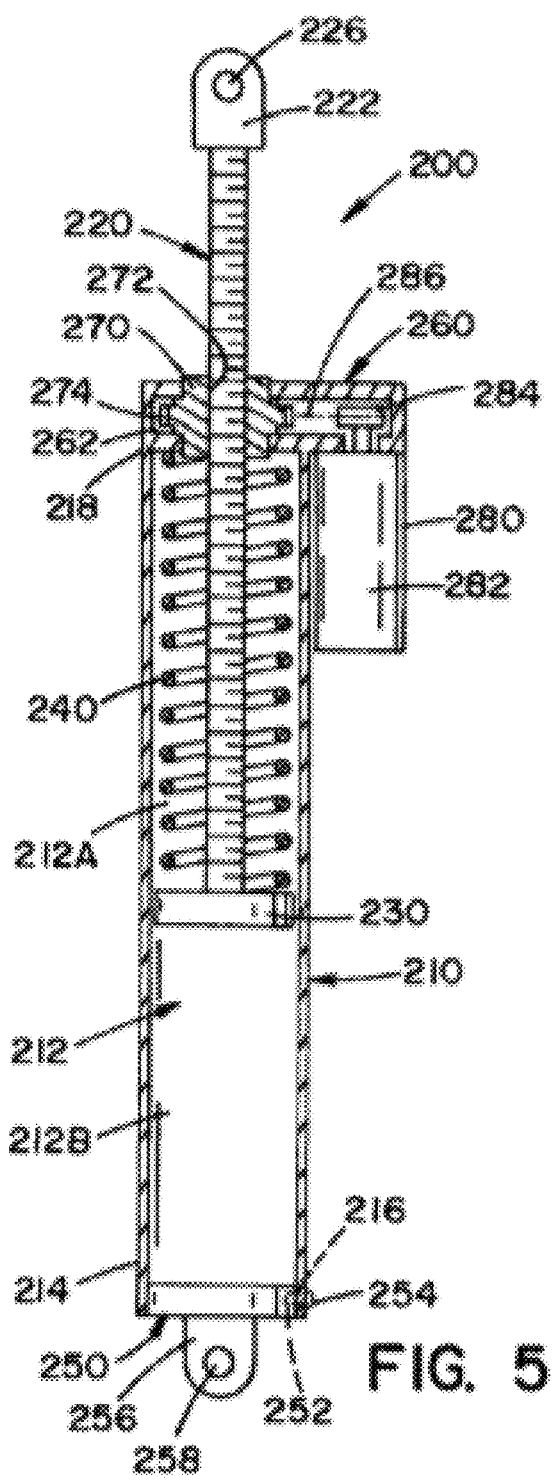
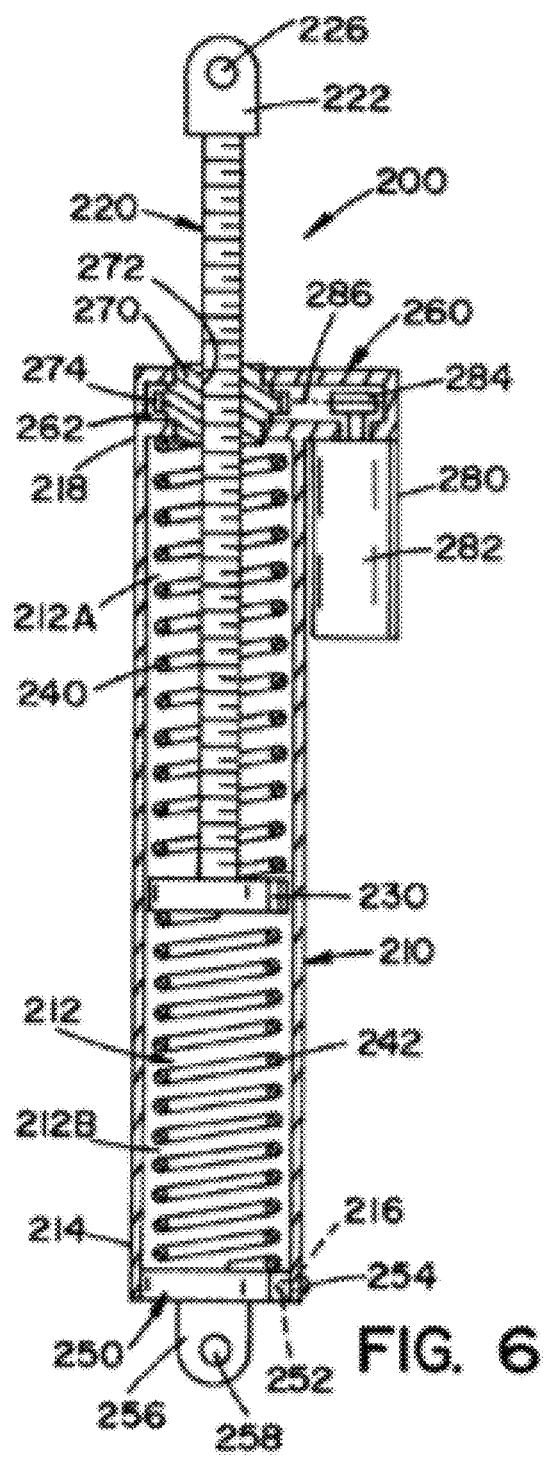

ELECTROMECHANICAL SPRING SYSTEM

The present disclosure is a continuation-in-part of U.S. patent application Ser. No. 14/850,134 filed Sep. 10, 2015, which in turn claims priority on U.S. Provisional Patent Application Ser. No. 62/052,554 filed Sep. 19, 2014, which is incorporated herein by reference.

The present disclosure relates to spring systems, particularly to a spring assembly that includes an adjustable spring system, and more particularly to a spring assembly that includes an adjustable spring system that is operated in tandem with a motor. The spring system of the present disclosure can be used in the medical field, automotive industry, manufacturing industry, building industry, etc. The spring system of the present disclosure can include one or more mechanical springs and/or include a compressible or non-compressible fluid. The spring system of the present disclosure can include one or more mechanical springs and/or include a compressible or non-compressible fluid that can optionally be configured to enable the spring system of the present disclosure to maintain a partial or full operation status when the motor is inoperable and/or disengaged. The spring system of the present disclosure can optionally include a disengagement arrangement and/or bypass arrangement that is configured to disengage the motor, yet still enable the spring system of the present disclosure to be partially or fully operational.

BACKGROUND OF THE DISCLOSURE

Large spring systems are commonly used in many applications (e.g., construction and agricultural equipment, marine equipment, industrial hutches, industrial equipment, aerospace equipment, heavy trucks, etc.). These large spring systems typically have a large footprint due to the large springs used in the spring system and/or the complicated hydraulic systems used with the spring system. As such, there is a continued demand for smaller spring systems that can be used to handle large loads.

Spring systems that include both mechanical and motor arrangements are typically designed to operate so long the motor is engage and/or operational. However, when the motor disengages or breaks, the spring system become inoperable.

SUMMARY OF THE DISCLOSURE

The present disclosure is directed to a novel spring assembly that includes the use of an adjustable spring system that adjusts the compression on one or more mechanical springs in the spring system and/or adjusts the pressure of one or more fluids in the spring assembly. The spring assembly includes an adjustable spring system that is operated in tandem with a motor. The spring system can include one or more mechanical springs and/or include a compressible or non-compressible fluid. The spring system can optionally be configured to enable the spring system to maintain a partial or full operation status when the motor is inoperable and/or disengaged. The spring system can optionally include a disengagement arrangement and/or bypass arrangement that is configured to disengage the motor, yet still enable the spring system of the present disclosure to be partially or fully operational. The spring system can optionally include one or more sensors to control the operation of the motor and/or cause the motor to be engaged or disengaged. The spring system can include a transmitter and/or receiver to transmit information about the spring system to a remote location and/or to receive information from a remote location, and wherein such information that is transmitted and/or received can be used to monitor the operation of the spring system and/or to control the spring system.

The spring assembly can be adjusted manually and/or by one or more motors. The one or more motors used in the spring system can be an electrical motor, hydraulic motor, fuel-powered motor, and the like.

In one non-limiting aspect of the disclosure, the spring system includes an outer sleeve having an internal cavity, an inner sleeve that is arranged for sliding displacement in the outer sleeve, a top rod and, optionally, a bottom rod. The internal cavity of the outer sleeve has a generally uniform cross-sectional shape and a generally constant cross-sectional area along a majority (e.g., 51-99.9% and all values and ranges therebetween) of the longitudinal length of outer sleeve; however, this is not required. The materials used to form the inner sleeve and the outer sleeve are non-limiting. The size, shape, and length of the inner sleeve and the outer sleeve are non-limiting. When the outer sleeve forms the top portion of the spring system, the rear portion of the outer sleeve can include a plug; however, this is not required. The plug can be designed to be removable; however, this is not required. Indents in the outer sleeve or other arrangements (e.g., adhesive, rivet, screw, pin, solder, weld bead, melted bond, crimp, etc.) can be used to secure the plug to the outer sleeve; however, this is not required. Likewise, when the inner sleeve forms the top portion of the spring system, the rear portion of the outer sleeve can include a plug; however, this is not required. The plug can be designed to be removable; however, this is not required. Indents in the outer sleeve or other arrangements (e.g., adhesive, rivet, screw, pin, solder, weld bead, melted bond, crimp, etc.) can be used to secure the plug to the outer sleeve; however, this is not required. The rear end of the spring system can optionally include a connection arrangement that can be used to facilitate in connecting the rear of the spring system to a fixture or other structure. The configuration of the connection arrangement is non-limiting (e.g., threaded end, connection hole, grooves, ribs, slots, notches, hook, etc.). The inner sleeve also typically includes an internal cavity. The top end of the spring system can optionally include a connection arrangement to facilitate in connecting the top of the spring system to a fixture or other structure. The configuration of the connection arrangement is non-limiting (e.g., threaded end, connection hole, grooves, ribs, slots, notches, hook, etc.).

When the outer sleeve forms the bottom portion of the spring system, the top portion of the outer sleeve can optionally include a tapered region that is designed to prevent the inner sleeve from disengaging from the outer sleeve when the inner sleeve is in the fully extended position. As such, the internal cavity of the outer sleeve can include multiple cross-sectional areas along the longitudinal length of the outer sleeve. Generally, a majority (51-99.5% and all values and ranges therebetween) of the longitudinal length of the internal cavity of the outer sleeve has a cross-sectional area that is greater than the smaller cross-sectional area region of the internal cavity. When the inner sleeve forms the top portion of the spring system, the bottom portion of the inner sleeve can include an outer cross-sectional area that is greater than the cross-sectional area of the internal cavity at the top portion of the outer sleeve so that the bottom portion of the inner sleeve cannot pass through the internal cavity at the top portion of the outer sleeve. The bottom portion of the inner sleeve can include an outer cross-sectional area that is less than a cross-sectional area of the internal cavity that is located below the top portion of the outer sleeve to that the bottom portion can slidably move within the internal cavity of the outer sleeve. The region between the bottom portion of the inner sleeve and the top portion of the inner sleeve can be tapered; however, this is not required. The cross-sectional shape and size of the bottom portion of the inner sleeve can be selected such that it has the same or similar shape as the cross-sectional shape of the internal cavity of the outer sleeve that is located below the top portion of the outer sleeve, and has a cross-sectional size that is slightly less than the cross-sectional size of the internal cavity of the outer sleeve that is located below the top portion of the outer sleeve. Such a size and shape arrangement can be used to guide the movement of the inner sleeve within the internal cavity of the outer sleeve.

When the outer sleeve forms the top portion of the spring system, the bottom portion of the outer sleeve can optionally include a tapered region that is designed to prevent disengagement from the inner sleeve when the outer sleeve is in the fully extended position. When the inner sleeve forms the bottom portion of the spring system, the top portion of the inner sleeve can include an outer cross-sectional area that is greater than the cross-sectional area of the internal cavity at the bottom portion of the outer sleeve so that the bottom portion of the outer sleeve cannot pass through the internal cavity at the top portion of the inner sleeve.

As can be appreciated, the spring system can include a third inner sleeve that is configured to move within the internal cavity of the inner sleeve. The shape and size relations of the third inner sleeve relative to the inner sleeve can be similar to the shape and size relationships of the inner sleeve to the outer sleeve as discussed above. As can be further appreciated, additional inner sleeves can be used.

The top portion of the top rod is configured to be connected to the top portion of the inner sleeve when the inner sleeve forms the top of the spring system (or the third or other sleeve if the spring system includes more than two sleeves). Alternatively, the top portion of the top rod is configured to be connected to the top portion of the outer sleeve when the outer sleeve forms the top of the spring system. In one non-limiting arrangement, the top portion of the top rod is connected to a top bushing which is in turn connected to the top portion of the inner sleeve when the inner sleeve forms the top of the spring system, or to the outer sleeve when the outer sleeve forms the top of the spring system. It can be appreciated that other or additional arrangements can be used to connect and/or interconnect the top portion of the top rod to the top portion of the inner/outer sleeve. A piston can be optionally connected to the top rod. The top rod includes an internal cavity and a base portion having an opening that provides access to the internal cavity. The internal cavity generally has a longitudinal length that constitutes a majority (51-99% and all values and ranges therebetween) of the longitudinal length of the top rod; however, this is not required. The base portion of the top rod can optionally include a bottom rod engagement element that is configured to engage with the bottom rod. In one non-limiting arrangement, the bottom rod engagement element is secured to the base portion of the top rod by indents and/or other arrangements (e.g., adhesive, rivet, screw, pin, solder, weld bead, melted bond, etc.). In another non-limiting configuration, the bottom rod engagement element includes a threaded opening to receive a threaded portion on the bottom rod. The top rod is generally positioned along the central longitudinal axis of the spring system and can be positioned in the internal cavity of the inner sleeve and outer sleeve. The length and shape and material of the top rod are non-limiting. The cross-sectional area of the top rod can be constant or vary along the longitudinal length of the top rod. The cross-sectional area of the top rod is generally less than the cross-sectional area of the internal cavity of the inner sleeve. Generally, the length of the top rod is equal to or greater than the longitudinal length of the internal cavity of the inner sleeve when the inner sleeve forms the top of the spring system, or the length of the top rod is equal to or greater than the longitudinal length of the internal cavity of the outer sleeve when the outer sleeve forms the top of the spring system; however, this is not required.

The bottom portion of the bottom rod is configured to be rotatably connected to the bottom portion of the spring system. In one non-limiting arrangement, the bottom portion of the bottom rod is rotatably connected to a drive housing that is connected to the bottom of the outer sleeve when the outer sleeve forms the bottom portion of the spring system, or the drive housing that is connected to the bottom of the inner sleeve when the inner sleeve forms the bottom portion of the spring system. The bottom portion of the rod can optionally pass through an opening in the bushing that is connected to the bottom portion of the outer sleeve when the outer sleeve forms the bottom portion of the spring system, or through an opening in the bushing that is connected to the bottom portion of the inner sleeve when the inner sleeve forms the bottom portion of the spring system; however, this is not required. The drive housing can be connected and/or interconnected to the bottom portion of the outer/inner sleeve and/or to the bushing by indents and/or other arrangements (e.g., adhesive, rivet, screw, pin, solder, weld bead, melted bond, etc.).

The top portion of the bottom rod generally includes an engagement portion that is configured to connect to the top rod and/or to the bottom rod engagement element in the top rod. In one non-limiting arrangement, the bottom rod includes a threaded region that is configured to threadedly engage the top rod and/or to the bottom rod engagement element in the top rod. In another non-limiting arrangement, the top portion of the bottom rod is configured to move within the internal cavity of the top rod. The bottom rod is generally positioned along the central longitudinal axis of the spring system and can be positioned in the internal cavity of the inner sleeve and outer sleeve. The length and shape and material of the bottom rod are non-limiting. The cross-sectional area of the bottom rod can be constant or vary along the longitudinal length of the top rod. The cross-sectional area of the bottom rod is generally less than the cross-sectional area of the internal cavity of the inner sleeve and outer sleeve and at least a portion of the top portion of the bottom rod has a cross-sectional area that is generally less than the cross-sectional area of the internal cavity of the top rod. Generally, the longitudinal length of the bottom rod is equal to or greater than the longitudinal length of the internal cavity of the outer sleeve; however, this is not required. Generally, the longitudinal length of the bottom rod is less or equal to the longitudinal length of the internal cavity of the top rod; however, this is not required.

In another non-limiting aspect of the disclosure, the spring system can be optionally configured to not include a bottom rod. In such an arrangement, the top portion of the top rod is configured to be connected to the top portion of the inner sleeve when the inner sleeve forms the top of the spring system (or the third or other sleeve if the spring system includes more than two sleeves). Alternatively, the top portion of the top rod is configured to be connected to the top portion of the outer sleeve when the outer sleeve forms the top of the spring system. In one non-limiting arrangement, the top portion of the top rod is connected to a top bushing and/or drive housing which is in turn connected to the top portion of the inner sleeve when the inner sleeve forms the top of the spring system, or to the top portion of the outer sleeve when the outer sleeve forms the top of the spring system; however, other or additional arrangements can be used to connect and/or interconnect the top portion of the top rod to the top portion of the inner/outer sleeve. A piston can be optionally connected to the top rod. The top bushing and/or drive housing can optionally form or include a top rod engagement element. In one non-limiting arrangement, the top rod engagement element includes a threaded opening to receive a threaded portion on the top rod. The top rod engagement element can be configured to rotate when the drive system in the drive housing is activated; however, this is not required. In one non-limiting configuration, the top bushing or a portion of a top bushing is caused to be rotated by the drive system in the drive housing. In another non-limiting configuration, a gear and/or threaded element located in the top bushing or which is part of the drive housing is configured to rotate when the drive system in the drive housing is activated; however, this is not required. The top rod is generally positioned along the central longitudinal axis of the spring system and can be positioned in the internal cavity of the outer and/or inner sleeve. The length and shape and material of the top rod are non-limiting. The cross-sectional area of the top rod can be constant or vary along the longitudinal length of the top rod. The cross-sectional area of the top rod is generally less than the cross-sectional area of the internal cavity of the outer and/or inner sleeve. Generally, the length of the top rod is equal to or greater than the longitudinal length of the internal cavity of the outer and/or inner sleeve; however, this is not required. The top rod is configured to be rotatably connected to the top portion of the spring system. The top portion of the rod is configured to pass through an opening in the top bushing and/or drive housing that is connected to the top portion of the outer and/or inner sleeve. The drive housing can be connected and/or interconnected to the top portion of the outer and/or inner sleeve and/or to the top bushing by indents and/or other arrangements (e.g., adhesive, rivet, screw, pin, solder, weld bead, melted bond, etc.). The top portion of the top rod includes an engagement portion that is configured to connect to the top bushing and/or to the drive housing. In one non-limiting arrangement, the top rod includes a threaded region that is configured to threadedly engage the top bushing and/or to the drive housing. The top end of the top rod can optionally include a connection arrangement (e.g., threaded end, connection hole, grooves, ribs, slots, notches, hook, etc.). In another non-limiting arrangement, the spring system includes an outer sleeve, and is absent an inner sleeve.

In still another and/or alternative non-limiting aspect of the disclosure, the interior cavity of the inner sleeve and/or outer sleeve optionally includes a fluid (e.g., gas, liquid, etc.) and/or one or more mechanical springs. The fluid may or may not be a compressible fluid. If one or more pistons are connected to the top and/or bottom rod, the one or more pistons can be used to form separate chambers wherein one or more of the chambers can optionally include a fluid (e.g., gas, liquid, etc.) and/or one or more mechanical springs. The one or more pistons can optionally include seals, passageways, valves, etc., to controllably allow fluid to pass through and/or about the one or more pistons; however, this is not required. At least one piston (when used) is generally connected to the end portion of the top and/or bottom rod; however, this is not required. The one or more pistons (when used) can be connected to the top and/or bottom rod by any number of means (e.g., adhesive, screw, rivet, nail, pin, solder, weld bead, melted bond, etc.). When one or more mechanical springs are optionally used, such one or more springs can be located on one or both sides of the piston. When two or more pistons are used, one or more springs can be located between two pistons; however, this is not required. When two or more mechanical springs are located in the internal cavity of one or more of the sleeves, the spring free length, wire type, wire thickness, cross-sectional shape of the wire, number of windings, wire material, and/or spring force of each spring can be the same or different. The free length of the one or more mechanical springs can be greater than, equal to, or less than the longitudinal length of the cavity of the one or more sleeves. As can be appreciated, when two or more springs are located on the same side of the piston, two or more of the springs can optionally be in a nested relationship and have the same or different direction of windings. As can be appreciated, a fluid (e.g., gas and/or liquid) optionally can be located on one or both sides of the piston. The fluid can be used in combination with one or more springs or as a substitute for one or more springs in the spring system. When fluid is included in the internal cavity of the one or more sleeves, the piston can be designed to controllably allow the fluid to flow through or past the piston as the piston moves along the longitudinal length of the one or more sleeves; however, this is not required.

In yet another and/or alternative non-limiting aspect of the disclosure, the drive housing includes one or more motors, one or more sprockets and, optionally, one or more gears. The type (electric, hydraulic, combustion, etc.), size, and power of the one or more motors are non-limiting. In one non-limiting configuration, the motor is an electric motor. The drive housing can optionally include a battery pack and/or battery housing. In another non-limiting configuration, a sprocket or gear is connected to the end of the motor which is configured to directly engage the top rod, the bottom rod, a gear system, or a rotatable component of the drive housing that engages the top or bottom rod. When a gear system is optionally used, the gear system can be used to adjust the gear ratio between the motor and the rotation speed of the top or bottom rod. The size and number of gears used are non-limiting. The spring system can optionally include a clutch or other type of release feature to enable the motor to be disengaged from the top rod, the bottom rod, a gear system, or a rotatable component of the drive housing that engages the top or bottom rod. The clutch or other type of release feature can be configured to allow for manual disengagement and/or automatic disengagement of the motor from the top rod, the bottom rod, a gear system, or a rotatable component of the drive housing that engages the top or bottom rod. In one non-limiting arrangement, the clutch or other type of release feature is configured to allow for a) manual disengagement, b) automated disengagement, and/or c) controlled disengagement from a remote location of the motor from the top rod, the bottom rod, a gear system, or a rotatable component of the drive housing that engages the top or bottom rod.

The spring assembly can optionally be configured to maintain operation after the motor has been disengaged from the top rod, the bottom rod, a gear system, or a rotatable component of the drive housing that engages the top or bottom rod. In such an arrangement, when the motor is no longer engaged with and/or driving the top or bottom rod, the spring system remains operational via the one or more mechanical springs and/or compressible fluids in the spring system. As such, the spring system can be configured to by-pass the motor, sprockets, and/or gears, but still be operational. Such a feature is a significant advantage over prior art spring systems that become inoperable once the motor fails and/or is disengaged from the top or bottom rod. In one non-limiting arrangement, the top or bottom rod is allowed to freely rotate when the motor is no longer engaged with and/or driving the top or bottom rod as the spring system moves between the fully retracted and fully extended positions. As can be appreciated, one or more gears, belts, clutch parts, etc., may also freely rotate when the motor is no longer engaged with and/or driving the top or bottom rod as the spring system moves between the fully retracted and fully extended positions.

Non-limiting features of the spring assembly of the present disclosure are described below.

1. The spring system includes a motor (electrical, pneumatic, or hydraulic), the type and size of which depends on the specific application of the spring system and the desired power source of the motor. In one non-limiting arrangement, the power of the motor is generally smaller relative to the force/speed of the spring assembly; however, this is not required.

2. The spring system includes a housing. One non-liming housing is a telescoping tube cover for two or more sleeves. The support of the rod engagement element (e.g., nut, etc.) can optionally serve as a spring guide. The support end can optionally be used on the wider end of the tube when using the tube design since there is more freedom of motion of the one or more springs and the reduction in risk to the damaging the thread of the lead screw or ball screw.

The spring system can include one or more of the following optional features:

1. The spring system can optionally have a compact rod and tube design. In such an optional configuration, the motor, clutch, etc., can be moved to or close to the central/mid-portion of the spring assembly (i.e., rod on one side, tube on the other).

2. The spring system optionally includes a clutch/coupling mechanism used in combination with the motor. The clutch/coupling mechanism (when used) can optionally include coupling via gears, belts, chains, etc., which allows for variable ratio of rotary motion. In one non-limiting arrangement, there is provided a 1:1 ratio; however, many other ratios can be used.

3. The clutch/coupling mechanism (when used) can optionally include a mechanical release feature that allows for manual bypass of the motor.

4. The clutch/coupling mechanism (when used) can optionally include an automated release feature that allows for manual bypass of the motor.

5. The spring system can optionally include one or more sensors that upon detecting/sensing a certain condition (e.g., too high temperature, loss of power, smoke, too high humidity, presence of certain types of gasses, too high particle concentration in air, too high torque, too high energy consumption, etc.) can cause an automated release feature to terminate operation of the motor and/or bypass the motor.

6. The spring system is optionally configured to maintain operation even when the motor malfunction or breaks and/or when the clutch/coupling mechanism disengages the motor from the gear arrangement and/or top/bottom rod. Such a feature is advantageous in fail-safe applications. When the spring system is configured to maintain operation even when the motor malfunction or breaks and/or when the clutch/coupling mechanism disengages the motor from the gear arrangement and/or top/bottom rod, the spring system can optionally include a non-locking pitch in the rotary to linear motion conversion mechanism.

7. The spring system optionally includes a clutch/coupling mechanism. The clutch/coupling mechanism optionally includes coupling via gears, belts, chains, etc., which allows for variable ratio of rotary motion. In one non-limiting arrangement, there is provided a 1:1 ratio; however, many other ratios can be used.

8. The spring system optionally includes a clutch/coupling mechanism which optionally includes a clutch release feature which is used to engage/disengage the motor from the gear arrangement and/or top/bottom rod.

9. The spring system can optionally include a controller that can be configured to receive information (e.g., wirelessly receive information, receive information via a wire/cable, etc.) from a remote location and upon receipt of certain instructions: to a) stop the motor; b) start the motor; c) cause the clutch/coupling mechanism to disengage from the motor; d) cause the clutch/coupling mechanism to engage with the motor; e) change the gear ratio; f) change and/or reprogram features on the controller (e.g., change temperature too high parameter, change too high of humidity parameter, change too high of particle concentration in air parameter, change too high of torque parameter, change too high of energy consumption parameter, change time, change date, change model number, change serial number, change password, change communication protocols, change password, change security protocols, change operation parameters, reprogram controller, update controller, update location, etc.); g) cause the spring system to move to the fully extended position; h) cause the spring system to move to the fully retracted position; and/or i) cause the spring system to move to a particular position.

10. The spring system can optionally include a controller that can be configured to transmit information (e.g., wirelessly receive information, receive information via a wire/cable, etc.) to a remote location to provide various information about the spring system (e.g., status of motor, status of clutch/coupling mechanism, service time of spring system, operation time of motor, gear ratio of spring system, temperature of motor, temperature about spring system, ambient humidity, ambient, particle concentration in air, sensor status, smoke detection, gas detection, motor torque, motor energy consumption parameter, time, date, model number, serial number, communication protocol settings, password setting, security protocol settings, current operation parameters, current location, the position of one sleeve relative to another sleeve, the percentage the spring system is in the fully extended/retracted position, etc.).

11. The spring system optionally includes a rotary-to-linear motion conversion mechanism (e.g., ball screw, acme screw, lead screw, rack and pinion, etc.).

12. The spring system includes a rod engagement element (e.g., nut, etc.) that can optionally be supported with the longer element/sleeve to shorten the length of the screw/lead component and increase the buckling force. This can be advantageous when the stroke of the spring system is less than half the length of the overall spring system.

13. The spring system can optionally include one or more mechanical springs. The one or more springs (when used) can be configured to counterbalance all or part of the load on the spring assembly. In one non-limiting configuration, the one or more springs are selected to be equal to or close to neutral/balance. The one or more springs (when used) can be positioned in only one sleeve or in two or more sleeves of the spring assembly. The configuration of the one or more springs is dependent on the specific application of the spring system. The one or more springs (when used) can continue to be operational in the spring system as the spring system moves between the fully extended and fully retracted portion in situations wherein the motor is operational and when the motor is disengaged. As such, the one or more mechanical springs enable the spring system to remain operational with or without the assistance of the motor.

14. The spring system can optionally include one or more mechanical springs, and the one or more springs can be arranged to achieve the following i) compressive/push force, ii) traction/pull force (still with the use of compression spring), iii) self-centering force (somewhere between fully extended and fully compressed, but not necessarily in the center), and/or iv) have a calculated positive force that results in the spring system being self-rising, self-closing, or forcibly closed for used in certain applications.

15. The spring system can be self-locking when power to the motor is lost (e.g., motor and gearing is in the form of brake in this scenario).

16. The spring system can include various motor orientations. For example, i) the motor can be offset from the spring system (which can be advantageous for spatial constraints of length) and/or ii) the motor can be in line with spring system (which can be advantageous for spatial constraints of diameter envelope).

17. The spring system can include friction-reducing elements. For example, the tube-to-tube joint arrangement can be configured to have a friction-reducing design to improve efficiency of the spring assembly (e.g., Teflon or other anti-friction coatings, etc.).

18. The spring system can include an embedded or attached sensor (e.g. strain sensor, pressure sensor, force sensor, cycle sensor, motor sensor, torque sensor, power sensor, linear sensor, angle sensor or inclinometer, sleeve position sensor, etc.) on or in the spring assembly. The one or more sensors can optionally be combined on one or more circuit boards or networked together. The one or more sensors can optionally be combined with an embedded or attached transmitter and and/or an embedded or attached circuit board to communicate to a remote location (e.g., central computing device [e.g. computer, mobile device, server, etc.]). The transmitted information can be used to monitor and/or determine the spring system's position and/or performance (e.g. compressed or closed, extended or open, whether or not the device is in motion, to what degree or percentage the spring system is compressed or extended, consistent distribution from spring assembly versus motor, fatigue, etc.). The transmitted information can be used to monitor, determine, and/or calculate on or more aspects of the spring system's life cycle (e.g. number of cycles, recorded forces of the spring assembly and or motor, diminishing or varied forces of the spring assembly or motor, interference, added loads, etc.).

19. The spring system can include a storage system to save data from the one or more sensors. The information can optionally be periodically transmitted from the storage system, and/or downloaded directly from the spring system. The one or more circuit boards can optionally be located on the motherboard of the motor.

20. The spring system can include embedded environmental sensors (e.g. temperature sensor, humidity sensor, gas sensor, debris sensor, smoke sensor, etc.). The one or more sensors can optionally be combined on one or more circuit boards or networked together. The one or more sensors can optionally be combined with an embedded or attached transmitter and/or an embedded or attached circuit board to communicate to a remote location (e.g., central computing device [e.g. computer, mobile device, server, etc.]). The transmitted information can be used to monitor and/or determine the environmental conditions surrounding the spring system and to what degree the conditions are hazardous to the spring system or individuals located close to the spring system. Computations can be optionally run/completed at a remote location that received the transmitted data from the spring system. The spring system can include a storage system to save data from the one or more sensors. The information can optionally be periodically transmitted from the storage system and/or downloaded directly from the spring system. The one or more circuit boards can optionally be located on the motherboard of the motor.

21. The spring system can include an embedded or attached transmitter to optionally communicate to a remote location (e.g., central computing device [e.g. computer, mobile device, server, etc.] a constant or intermittent signal that communicates the state of the spring system (e.g. powered, connected to the network, operational, etc.). The spring system can optionally include a receiver to receive information from a remote location. The information that is received/transmitted by the spring system can be used to verify that the spring system is properly receiving/transmitting information.

22. The spring system can be configured to allow programming of the motor's motherboard and/or one or more sensors embedded or attached on the spring assembly. The programming can occur from a remote location (e.g. wired, wirelessly, etc.) and/or be conducted directly on the spring system.

23. The spring system, when it includes a clutch/coupling mechanism, may optionally be fitted with a solenoid and/or additional electro-magnetic clutch that an operator can use to remotely disengage the spring system.

24. The spring system may be engineered to have pre-load in the spring assembly significant enough to override thus enabling the spring system to operate (e.g., extend) beyond its current state (e.g. >5%).

25. The spring system may be programmed to automatically disengage using the solenoid or electro-magnetic clutch if a predefined/programmed condition is sensed/recognized (e.g. loss of power, network interruption, hazardous gas, hazardous temperature, hazardous debris/smoke, excessive torque, excessive power consumption, etc.). As can be appreciated, the automated system of the spring system can also or alternatively lock the spring system in a certain position and/or power-off the motor.

26. The spring system may be designed to enable remote disengagement using the solenoid or electro-magnetic clutch if a predefined/programmed condition is sensed/recognized (e.g. loss of power, network interruption, hazardous gas, hazardous temperature, hazardous debris/smoke, excessive torque, excessive power consumption, etc.) by using an embedded or attached transmitter/receiver that communicates sensed/recognized condition to a remote location (e.g., central computing device [e.g. computer, mobile device, server, etc.]) and a signal from the remote location is sent and received by the spring system to disengage the motor using the solenoid or electro-magnetic clutch. As can be appreciated, the transmission from the remote location to the spring system can also or alternatively cause the spring system to lock in a certain position and/or power-off the motor.

27. The spring system can be fitted with a global positioning system and wireless technology designed to transmit (radio) signals (e.g. Wi-Fi, Bluetooth, Zigbee, etc.).

28. The spring system can be operated remotely as an individual unit, in tandem with other springs systems, and/or in sequence with other spring systems.

29. The operation of the spring system can be programmed as an automatic action defined as a condition (e.g. regional hazard, regional security breach, etc.) recognized by sensors embedded and/or attached to the spring system and optionally communicated to a remote location. The automatic action is non-limiting (e.g., disengage motor, power-off motor, lock the spring system in a certain position, move spring system to a certain position, etc.).

30. The motor of the spring system may be programmed to provide resisting force to the spring assembly, forcing the spring assembly into a non-operable state. This configuration may optionally be set as the resting state of the spring assembly, remotely activated, and/or programmed to engage itself automatically under specified conditions (e.g. forced entry, hazardous conditions, etc.).

31. The spring system can be optionally fitted with torque sensor and/or programmed (e.g., programmed within the motor's motherboard, etc.) to detect interference with the spring system operation and/or motor operation and to automatically stop or reverse the motor operation and/or operation of the spring system, and/or disengage the motor.

32. The spring system can optionally include an embedded or attached camera and/or audio recording device. The camera and/or audio recording device can optionally be powered in-line with the motor or have its own power supply. The camera and/or audio recording device can be connected with one or more sensors (e.g. inclinometer, motion sensor, etc.) that could be used to detect and/or record the motion, orientation, and/or position of the spring system. The camera and/or audio recording device in combination with one or more sensors can be used to initiate an action (e.g., stop or reverse the motor operation and/or operation of the spring system, and/or disengage the motor, etc.).

Non-limiting applications of the spring assembly of the present disclosure are as follows: a) construction and agricultural equipment such as, but not limited to, hatch, hood, door, service panel actuation mechanisms, etc.; b) marine equipment, such as, but not limited to, wake tower fold down actuation mechanisms, hatch actuation mechanisms, etc.; c) industrial hatches (including road, sidewalk, airport, and utility ground/roof access hatches) such as, but not limited to, open/close actuation mechanisms, etc.; d) industrial equipment such as, but not limited to, actuation mechanisms, etc.; e) aerospace equipment such as, but not limited to, actuation mechanisms, etc.; f) heavy truck equipment such as, but not limited to, hood lifts, cab lifts, access panel lifts, etc.; g) automotive parts such as, but not limited to, hood lifts, hatchback lifts, etc.; and/or h) medical equipment such as, but not limited to, bed lifts, chair lifts, etc.

In one non-limiting object of the present disclosure, there is provided a spring assembly that includes an adjustable spring system that adjusts the compression on one or more mechanical springs in the spring system and/or adjusts the pressure of one or more fluids in the spring assembly.

In another and/or alternative non-limiting object of the present disclosure, there is provided a spring assembly that is operated in tandem with a motor.

In another and/or alternative non-limiting object of the present disclosure, there is provided a spring assembly that includes one or more mechanical springs and/or includes a compressible or non-compressible fluid.

In another and/or alternative non-limiting object of the present disclosure, there is provided a spring assembly that is optionally configured to enable the spring system to maintain a partial or full operation status when the motor is inoperable and/or disengaged.

In another and/or alternative non-limiting object of the present disclosure, there is provided a spring assembly that optionally includes a disengagement arrangement and/or bypass arrangement configured to disengage the motor.

In another and/or alternative non-limiting object of the present disclosure, there is provided a spring assembly that optionally includes a disengagement arrangement, overriding arrangement and/or bypass arrangement configured to disengage the motor, yet still enables the spring system to be partially or fully operational.

In another and/or alternative non-limiting object of the present disclosure, there is provided a spring assembly that optionally includes one or more sensors used to control the operation of the motor and/or cause the motor to be engaged or disengaged.

In another and/or alternative non-limiting object of the present disclosure, there is provided a spring assembly that optionally includes a transmitter and/or receiver to transmit information about the spring system to a remote location and/or to receive information from a remote location, and wherein such information transmitted and/or received can be used to monitor the operation of the spring system and/or to control the spring system.

In another and/or alternative non-limiting object of the present disclosure, there is provided a spring assembly that can be used in: a) construction and agricultural equipment such as, but not limited to, hatch, hood, door, service panel actuation mechanisms, etc.; b) marine equipment, such as, but not limited to, wake tower fold down actuation mechanisms, hatch actuation mechanisms, etc.; c) industrial hatches (including road, sidewalk, airport, and utility ground/roof access hatches) such as, but not limited to, open/close actuation mechanisms, etc.; d) industrial equipment such as, but not limited to, actuation mechanisms, etc.; e) aerospace equipment such as, but not limited to, actuation mechanisms, etc.; f) heavy truck equipment such as, but not limited to, hood lifts, cab lifts, access panel lifts, etc.; g) automotive parts such as, but not limited to, hood lifts, hatchback lifts, etc.; and/or h) medical equipment such as, but not limited to, bed lifts, chair lifts, etc.

In another and/or alternative non-limiting object of the present disclosure, there is provided a spring assembly that can be adjusted manually and/or by one or more motors.

In another and/or alternative non-limiting object of the present disclosure, there is provided a spring assembly that optionally includes an outer sleeve having an internal cavity, an inner sleeve that is arranged for sliding displacement in the outer sleeve, a top rod and, optionally, a bottom rod.

In another and/or alternative non-limiting object of the present disclosure, there is provided a spring assembly that optionally includes an inner and outer sleeve and wherein when the outer sleeve forms the bottom portion of the spring system, the top portion of the outer sleeve can optionally include a tapered region that is designed to prevent the inner sleeve from disengaging from the outer sleeve when the inner sleeve is in the fully extended position.

In another and/or alternative non-limiting object of the present disclosure, there is provided a spring assembly that optionally includes an inner and outer sleeve and wherein when the inner sleeve forms the top portion of the spring system, the bottom portion of the inner sleeve can include an outer cross-sectional area that is greater than the cross-sectional area of the internal cavity at the top portion of the outer sleeve so that the bottom portion of the inner sleeve cannot pass through the internal cavity at the top portion of the outer sleeve.

In another and/or alternative non-limiting object of the present disclosure, there is provided a spring assembly that optionally includes a top rod that includes an internal cavity and a base portion having an opening that provides access to the internal cavity.

In another and/or alternative non-limiting object of the present disclosure, there is provided a spring assembly that optionally includes a top rod that includes an internal cavity and a base portion having an opening that provides access to the internal cavity, and wherein the base portion of the top rod can optionally include a bottom rod engagement element that is configured to engage with a bottom rod.

In another and/or alternative non-limiting object of the present disclosure, there is provided a spring assembly that optionally includes a top rod that includes an internal cavity and a base portion having an opening that provides access to the internal cavity, and wherein the base portion of the top rod can optionally include a bottom rod engagement element that is configured to engage with a bottom rod, and wherein the bottom rod engagement element includes a threaded opening to receive a threaded portion on the bottom rod.

In another and/or alternative non-limiting object of the present disclosure, there is provided a spring assembly that optionally includes a bottom portion of a bottom rod that is configured to be rotatably connected to a bottom portion of the spring system.

In another and/or alternative non-limiting object of the present disclosure, there is provided a spring assembly that optionally includes a bottom portion of a bottom rod that is configured to be rotatably connected to a bottom portion of the spring system, and wherein the bottom portion of the bottom rod is rotatably connected to a drive housing that is connected to the bottom of a sleeve that forms the bottom portion of the spring system.

In another and/or alternative non-limiting object of the present disclosure, there is provided a spring assembly that optionally includes a top and bottom rod and wherein the bottom rod includes a threaded region that is configured to threadedly engage the top rod and/or to the bottom rod engagement element in the top rod, and the bottom rod is configured to move within the internal cavity of the top rod.

In another and/or alternative non-limiting object of the present disclosure, there is provided a spring assembly that optionally includes a clutch or other type of release feature to enable the motor to be disengaged from the top rod, the bottom rod, a gear system, or a rotatable component of the drive housing that engages the top or bottom rod.

In another and/or alternative non-limiting object of the present disclosure, there is provided a spring assembly that optionally includes a clutch or other type of release feature configured to allow for manual disengagement and/or automatic disengagement of the motor from the top rod, the bottom rod, a gear system, or a rotatable component of the drive housing that engages the top or bottom rod.

In another and/or alternative non-limiting object of the present disclosure, there is provided a spring assembly that optionally includes a clutch or other type of release feature configured to allow for a) manual disengagement, b) automated disengagement, and/or c) controlled disengagement from a remote location of the motor from the top rod, the bottom rod, a gear system, or a rotatable component of the drive housing that engages the top or bottom rod.

In another and/or alternative non-limiting object of the present disclosure, there is provided a spring assembly that optionally is configured to maintain operation after the motor has been disengaged from the top rod, the bottom rod, a gear system, or a rotatable component of the drive housing that engages the top or bottom rod such that when the motor is no longer engaged with and/or driving the top or bottom rod, the spring system remains operational via the one or more mechanical springs and/or compressible fluids in the spring system.

In another and/or alternative non-limiting object of the present disclosure, there is provided a spring assembly that optionally has a compact rod and tube design, wherein the motor, clutch, etc., can be moved to or close to the central/mid portion of the spring assembly.

In another and/or alternative non-limiting object of the present disclosure, there is provided a spring assembly that optionally includes one or more sensors that upon detecting/sensing a certain condition (e.g., too high temperature, loss of power, smoke, too high humidity, presence of certain types of gasses, too high particle concentration in air, too high torque, too high energy consumption, etc.) can cause: a) an automated release feature to terminate operation of the motor and/or bypass the motor; b) cause a signal to be sent to a remote location wherein a signal is sent from the remote location to the spring system to cause the termination of operation of the motor and/or to bypass the motor; or c) cause an audible and/or visual alarm on the spring system to be activated to inform the user to 1) termination operation of the spring system, 2) manually bypass the motor, or 3) turn off the motor.

In another and/or alternative non-limiting object of the present disclosure, there is provided a spring assembly that is optionally configured to maintain operation even when the motor malfunctions or breaks and/or when the clutch/coupling mechanism disengages the motor from the gear arrangement and/or top/bottom rod.

In another and/or alternative non-limiting object of the present disclosure, there is provided a spring assembly that is optionally configured to include a non-locking pitch in the rotary-to-linear motion conversion mechanism.

In another and/or alternative non-limiting object of the present disclosure, there is provided a spring assembly that optionally includes a controller that can be configured to receive information (e.g., wirelessly receive information, receive information via a wire/cable, etc.) from a remote location and upon receipt of certain instructions to: a) stop the motor; b) start the motor; c) cause the clutch/coupling mechanism to disengage from the motor; d) cause the clutch/coupling mechanism to engage with the motor; e) change the gear ratio; f) change and/or reprogram features on the controller (e.g., change temperature too high parameter, change too high humidity parameter, change too high particle concentration in air parameter, change too high torque parameter, change too high energy consumption parameter, change too high pressure parameter, change gas detection parameter, change too high smoke parameter, change time, change date, change model number, change serial number, change password, change communication protocols, change password, change security protocols, change operation parameters, reprogram controller, update controller, update location, reset alarms, change alarm parameters, change wireless transmission parameters, change transmission parameters, etc.; g) cause the spring system to move to the fully extended position; h) cause the spring system to move to the fully retracted position; and/or i) cause the spring system to move to a particular position.

In another and/or alternative non-limiting object of the present disclosure, there is provided a spring assembly that optionally includes a controller that can be configured to transmit information (e.g., wirelessly receive information, receive information via a wire/cable, etc.) to a remote location to provide various information about the spring system (e.g., status of motor, status of clutch/coupling mechanism, service time of spring system, operation time of motor, gear ratio of spring system, temperature of motor, temperature about spring system, ambient humidity, ambient, particle concentration in air, sensor status, smoke, detection, gas detection, motor torque, motor energy consumption parameter, time, date, model number, serial number, communication protocol settings, password setting, security protocol settings, current operation parameters, current location, the position of one sleeve relative to another sleeve, the percentage the spring system is in the fully extended/retracted position, etc.).

In another and/or alternative non-limiting object of the present disclosure, there is provided a spring assembly that optionally includes one or more mechanical springs, and the one or more springs can be arranged to achieve the following i) compressive/push force, ii) traction/pull force (still with the use of compression spring), iii) self-centering force (somewhere between fully extended and fully compressed, but not necessarily in the center), and/or iv) have a calculated positive force that results in the spring system being self-rising, self-closing, or forcibly closed for used in certain applications.

In another and/or alternative non-limiting object of the present disclosure, there is provided a spring assembly that optionally is self-locking when power to the motor is lost.

In another and/or alternative non-limiting object of the present disclosure, there is provided a spring assembly that optionally includes friction reducing elements.

In another and/or alternative non-limiting object of the present disclosure, there is provided a spring assembly that optionally includes an embedded or attached sensor (e.g. strain sensor, pressure sensor, strain gauge, torque sensor, power sensor, linear sensor, angle sensor or inclinometer, etc.) on or in the spring assembly.

In another and/or alternative non-limiting object of the present disclosure, there is provided a spring assembly that optionally includes one or more sensors that can optionally be combined on one or more circuit boards or networked together.

In another and/or alternative non-limiting object of the present disclosure, there is provided a spring assembly that optionally includes one or more sensors that can optionally be combined with an embedded or attached transmitter and and/or an embedded or attached circuit board to communicate to a remote location (e.g., central computing device [e.g. computer, mobile device, server, etc.]).

In another and/or alternative non-limiting object of the present disclosure, there is provided a spring assembly that optionally includes one or more sensors that can optionally be used to monitor and/or determine the spring system's position and/or performance (e.g. compressed or closed, extended or open, whether or not the device is in motion, to what degree or percentage the spring system is compressed or extended, consistent distribution from spring assembly versus motor, fatigue, etc.).

In another and/or alternative non-limiting object of the present disclosure, there is provided a spring assembly that optionally includes one or more sensors that can optionally be used to monitor, determine, and/or calculate on or more aspects of the spring system's life cycle (e.g. number of cycles, recorded forces of the spring assembly and or motor, diminishing or varied forces of the spring assembly or motor, interference, added loads, etc.).

In another and/or alternative non-limiting object of the present disclosure, there is provided a spring assembly that optionally includes one or more environmental sensors (e.g. temperature sensor, humidity sensor, gas sensor, debris sensor, smoke sensor, etc.).

In another and/or alternative non-limiting object of the present disclosure, there is provided a spring assembly that optionally includes one or more environmental sensors to monitor and/or determine the environmental conditions surrounding the spring system and to what degree the conditions are hazardous to the spring system or individuals located close to the spring system.

In another and/or alternative non-limiting object of the present disclosure, there is provided a spring assembly that optionally includes a transmitter that optionally communicates to a remote location (e.g., central computing device [e.g. computer, mobile device, server, etc.]) a constant or intermittent signal that communicates the state of the spring system (e.g. powered, connected to the network, operational, etc.).

In another and/or alternative non-limiting object of the present disclosure, there is provided a spring assembly that optionally includes a receiver to receive information from a remote location.

In another and/or alternative non-limiting object of the present disclosure, there is provided a spring assembly that optionally includes a clutch/coupling mechanism and may optionally be fitted with a solenoid and/or additional electromagnetic clutch that an operator can use to remotely disengage the spring system.

In another and/or alternative non-limiting object of the present disclosure, there is provided a spring assembly that optionally includes a controller that may be programmed to automatically disengage using the solenoid or electro-magnetic clutch if a predefined/programmed condition is sensed/recognized (e.g. loss of power, network interruption, hazardous gas, hazardous temperature, hazardous debris/smoke, excessive torque, excessive power consumption, etc.).

In another and/or alternative non-limiting object of the present disclosure, there is provided a spring assembly that optionally can enable remote disengagement using the solenoid or electro-magnetic clutch if a predefined/programmed condition is sensed/recognized (e.g. loss of power, network interruption, hazardous gas, hazardous temperature, hazardous debris/smoke, excessive torque, excessive power consumption, etc.) by using an embedded or attached transmitter/receiver that communicates a sensed/recognized condition to a remote location (e.g., central computing device [e.g. computer, mobile device, server, etc.]) and a signal from the remote location is sent and then received by the spring system to disengage the motor using the solenoid or electro-magnetic clutch.

In another and/or alternative non-limiting object of the present disclosure, there is provided a spring assembly that optionally includes a controller that can be programmed to perform an automatic action defined as a condition (e.g. regional hazard, regional security breach, etc.) recognized by sensors embedded and/or attached to the spring system and optionally communicated to a remote location.

In another and/or alternative non-limiting object of the present disclosure, there is provided a spring assembly that optionally includes a controller that can be programmed to set and/or change the parameters of one or more sensors, communication protocols, etc.

In another and/or alternative non-limiting object of the present disclosure, there is provided a spring assembly that optionally be programmed to provide resisting force to the spring assembly forcing the spring assembly into a non-operable state.

In another and/or alternative non-limiting object of the present disclosure, there is provided a spring assembly that optionally is fitted with torque sensor and/or programmed (e.g., programmed within the motor's motherboard, etc.) to detect interference with the spring system operation and/or motor operation and to automatically stop or reverse the motor operation and/or operation of the spring system, and/or disengage the motor.

In another and/or alternative non-limiting object of the present disclosure, there is provided a spring assembly that optionally includes a camera and/or audio recording device that can optionally be connected with one or more sensors (e.g. inclinometer, motion sensor, etc.) that could be used to 1) detect and/or record the motion, orientation, and/or position of the spring system, and/or 2) initiate an action (e.g., stop or reverse the motor operation and/or operation of the spring system, and/or disengage the motor, etc.).

In another and/or alternative non-limiting object of the present disclosure, there is provided: a spring system comprising a top sleeve having an internal chamber; a bottom sleeve having an internal chamber and arranged for sliding displacement relative to said top sleeve, said top and bottom sleeves slidably connected together; a top rod positioned in and connected to said internal chamber of said top sleeve, said top rod connected to said top sleeve such that said top rod does not rotate relative to said top sleeve, said top rod includes an internal cavity and a bottom rod connector secured in said internal cavity, said bottom rod connector includes a threaded opening; a bottom rod positioned in and connected to said internal chamber of said bottom sleeve, said bottom rod rotatably connected to said top rod, a top portion of said bottom rod extending into said internal cavity of said top rod and configured to move within said internal cavity when said top sleeve moves between said extended and retracted positions, said bottom rod not connected to said top sleeve, said bottom rod connector connected to a rod connection portion of said bottom rod; a mechanical spring positioned in said internal chamber of said bottom sleeve, said internal chamber of said top sleeve, or combinations thereof, said mechanical spring not connected at either end to said top sleeve or said bottom sleeve; and, a drive system, said drive system including a base mount, a motor, a motor housing, a drive system, and a drive disengagement arrangement, said base mount connected to a bottom portion of said bottom sleeve and a bottom portion of said motor housing, said motor at least partially positioned in said motor housing, said drive system interconnecting said motor to said bottom rod to enable said motor to cause rotation of said bottom rod, said drive disengagement arrangement including a release arrangement configured to cause said motor to no longer cause rotation of said bottom rod, said release arrangement configured to cause a) said motor to be displaced to a motor non-engagement position when said drive disengagement arrangement is activated and/or b) one or more components of said drive arrangement to be displaced to a drive non-engagement position when said drive disengagement arrangement is activated; and wherein said top and bottom sleeves continue to be slidably displaceable relative to one another after said drive disengagement arrangement is activated; and wherein rotation of said bottom rod in a first direction causes said top rod to move in a direction that causes said top sleeve to move to an extended position, and wherein rotation of said bottom rod in a direction opposite said first direction causes said top rod to move in a direction that causes said top sleeve to move to a retracted position.

In another and/or alternative non-limiting object of the present disclosure, there is provided a spring system wherein said bottom rod is configured to rotate as said top sleeve moved between said extended position and said retracted position while said drive disengagement arrangement is activated and not activated.

In another and/or alternative non-limiting object of the present disclosure, there is provided a spring system wherein said spring system remains operable and continues to provide a counterbalance force via said mechanical spring after said drive disengagement arrangement is activated.

In another and/or alternative non-limiting object of the present disclosure, there is provided a spring system that further includes a controller, said controller configured to control operation of said motor, said controller including programming that causes said motor to rotate until a maximum resisting force is obtained that results in said spring system being inoperable.

In another and/or alternative non-limiting object of the present disclosure, there is provided a spring system that further includes a communication interface, said communication interface configured to interface with said controller, said communication interface configured to receive signals from a remote location to cause said controller to cause said motor to rotate until said maximum resisting force is obtained.

In another and/or alternative non-limiting object of the present disclosure, there is provided a spring system wherein said controller causes said motor to rotate until said maximum resisting force is obtained when said spring system is a) in a resting state, b) said controller is remotely activated to cause motor to rotate until said maximum resisting force is obtained, and/or c) said controller is programmed to automatically cause said motor to rotate until said maximum resisting force is obtained under specified conditions, said specified conditions including detection of forced entry, hazardous conditions, loss of power, and network interruption.

In another and/or alternative non-limiting object of the present disclosure, there is provided a spring system wherein said drive disengagement arrangement includes a solenoid clutch, said solenoid clutch causing said motor and/or one or more gears in said drive system to become displaced when said drive disengagement arrangement is activated.

In another and/or alternative non-limiting object of the present disclosure, there is provided a spring system that further includes a controller, said controller interfaced with said drive disengagement arrangement, said controller programmed to cause said solenoid clutch to displace said motor and/or one or more of said gears when said drive disengagement arrangement is activated by a user or remotely activated.

In another and/or alternative non-limiting object of the present disclosure, there is provided a spring system wherein said controller activates said drive disengagement arrangement if a programmed condition is detected, said programmed condition including one or more conditions selected from the group consisting of detection of loss of power, detection of network interruption, detection of presence of a gas above a pre-defined level, detection of a temperature above a predefined level, detection of debris in air above a predefined level, detection of smoke above a predefined level, detection of torque above a predefined level, detection of torque below a predefined level, and detection of humidity above a predefined level.

In another and/or alternative non-limiting object of the present disclosure, there is provided a spring system that further includes a communication interface, said communication interface configured to interface with said controller, said communication interface configured to transmit and/or receive information from and/or to a remote data device, said data device including one or more devices selected from the group consisting of a server, a computer, and a mobile smart device.

In another and/or alternative non-limiting object of the present disclosure, there is provided a spring system that further includes a controller and a sensor arrangement, said sensor arrangement interfaced with said controller, said sensor arrangement including one or more sensors selected from the group consisting of a temperature sensor, a humidity sensor, a gas sensor, a debris sensor, a smoke sensor, a loss of power sensor, a network status/interruption sensor, a torque sensor, a power sensor, an inclination sensor, an optical sensor, a strain sensor, pressure sensor, motion sensor, force sensor, cycle sensor, motor sensor, linear sensor, and sleeve position sensor.

In another and/or alternative non-limiting object of the present disclosure, there is provided a spring system that further includes a communication interface, said communication interface configured to interface with said controller, said communication interface configured to transmit and/or receive information from and/or to a remote data device, said data device including one or more devices selected from the group consisting of a server, a computer, and a mobile smart device.

In another and/or alternative non-limiting object of the present disclosure, there is provided a spring system wherein said information transmitted to said remote data device is stored and/or communicated to one or more other data devices.

In another and/or alternative non-limiting object of the present disclosure, there is provided a spring system wherein information from said sensor arrangement is used to detect improper operational parameters of said spring system and, if such improper operational parameters are detected, to a) automatically stop operation of said spring system, b) reverse rotation direction of said motor, and/or c) activate said drive disengagement arrangement.

In another and/or alternative non-limiting object of the present disclosure, there is provided a spring system that further includes a controller and a communication interface, said communication interface configured to interface with said controller, said communication interface configured to communicate with other spring systems.

In another and/or alternative non-limiting object of the present disclosure, there is provided a spring system that further includes a controller and a communication interface, said communication interface configured to communicate constantly or intermittently with a remote data device, data that is communicated between said communication interface and said remote data device include information selected from the group consisting: of spring system properly powered, spring system connected to a network, spring system operational status, number of cycles performed by spring system, recorded forces of said spring assembly, recorded forces of said motor, loads exerted on said spring system, diminishing or varied forces of said spring assembly, diminishing or varied forces of said motor, and recorded interference of operation of said spring system.

In another and/or alternative non-limiting object of the present disclosure, there is provided a spring system that further includes a controller, a GPS device, and a communication interface, said communication interface configured to communicate by a wired connection and/or wirelessly with a remote data device and/or other spring systems, said spring system is configured to be operated remotely, in tandem with other of said springs systems, and/or in sequence with other of said spring systems.

In another and/or alternative non-limiting object of the present disclosure, there is provided a spring system wherein said communicated information to said remote data device is used to a) determine position of spring system, b) determine performance of said spring system, c) determine position of one sleeve relative to another sleeve of said spring system, d) determine if said spring system is in the fully retracted position, e) determine if spring system is in the fully extended position, f) determine if said spring system is currently operating, g) determine if said spring system is currently not operating, h) determine to what degree or percentage said spring system is compressed or extended, i) determine consistent distribution from spring assembly versus motor, and/or j) determine fatigue of spring system.

In another and/or alternative non-limiting object of the present disclosure, there is provided a spring system that further includes a controller and position detection arrangement, said position detection arrangement interfaced with said controller, said position detection arrangement including one or more of a camera, audio recording device, motion sensor, and inclinometer, said position detection arrangement configured to detect motion of said spring system, position of said top sleeve relative to said bottom, and/or operation of said spring system.

These and other objects and advantages will become apparent from the following description taken together with the accompanying drawings.

BRIEF DESCRIPTION OF THE DRAWINGS

Reference may now be made to the drawings, which illustrate several non-limiting embodiments that the disclosure may take in physical form and in certain parts and arrangements of parts wherein;

FIG. 5 is a sectional view of another non-limiting embodiment of the spring system in accordance with the present disclosure;

FIG. 6 is a sectional view of another non-limiting embodiment of the spring system in accordance with the present disclosure;

DESCRIPTION OF NON-LIMITING EMBODIMENTS

Figure 1:
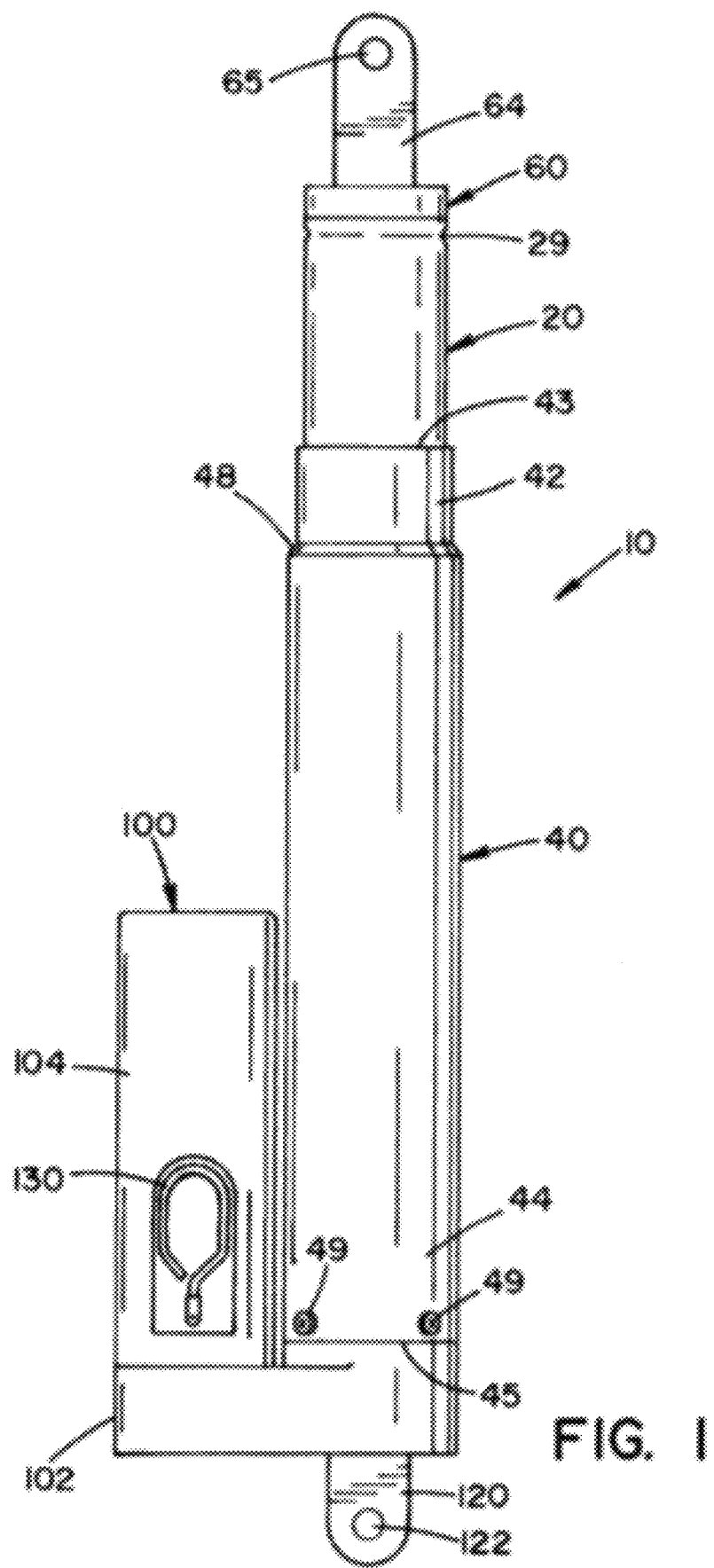
FIG. 1 is a side plan view of the spring system according to one non-limiting embodiment.

A more complete understanding of the articles/devices, processes, and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Referring now to the drawings wherein the showings are for the purpose of illustrating non-limiting embodiments of the disclosure only and not for the purpose of limiting same, FIG. 1 illustrates one non-limiting embodiment of the spring system 10 of the present disclosure. The spring system includes an inner sleeve 20, an outer sleeve 40, a top rod 60, a bottom rod 90, a coil spring 80, and a drive housing 100.

The outer sleeve 40 is a generally cylindrical body that includes a top portion 42 having a top end 43, a bottom portion 44 having a bottom end 45, an internal cavity 46 (which generally has a circular cross-sectional shape), and a tapered region 48. As can be appreciated, the shape of the outer sleeve and shape of the inner cavity can have other shapes. The cross-sectional area of the internal cavity of the bottom portion of the outer sleeve is greater in size than the internal cavity of the top portion of the outer sleeve. Likewise, the cross-sectional area of the outer surface of the bottom portion of the outer sleeve is greater in size than the outer surface of the top portion of the outer sleeve.

The inner sleeve 20 is a generally cylindrical body that includes a top portion 22 having a top end 23, a bottom portion 24 having a bottom end 25, an internal cavity 26 (which generally has a circular cross-sectional shape), and a tapered region 28. As can be appreciated, the outer sleeve and shape of the inner cavity can have other shapes. The cross-sectional area of the internal cavity of the bottom portion of the inner sleeve is greater in size than the internal cavity of the top portion of the inner sleeve. Likewise, the cross-sectional area of the outer surface of the bottom portion of the inner sleeve is greater in size than the outer surface of the top portion of the inner sleeve.

The top portion 22 of the inner sleeve 20 has a cross-sectional shape and size to enable the top portion to move in the internal cavity 46 of the outer sleeve 40 between a fully retracted and fully extended position. The bottom portion of the inner sleeve has a cross-sectional shape and size to enable the bottom portion to move in the internal cavity 46 of the bottom portion of the outer sleeve, but is unable to pass through the internal cavity of the top portion of the outer sleeve. As such, the spring system includes two housing sleeves wherein one housing sleeve is telescopically received by the other housing sleeve and are designed to move relative to one another between fully compressed (fully retracted) and fully expanded (fully extended) positions.

Although not shown, the inner sleeve and/or outer sleeve can optionally include a rotation limiting arrangement that inhibits or prevents the relative rotation of the sleeves relative to one another when the spring system moves between the fully compressed (fully retracted) and fully expanded (fully extended) positions. In one non-limiting arrangement, the inner and outer sleeves are configured to only move in a linear direction relative to one another. Such a rotation limiting arrangement ensures that the inner sleeve substantially or only moves along the longitudinal axis of the spring system and has little or no rotational movement about the longitudinal axis of the spring system when the inner sleeve moves between the fully compressed (fully retracted) and fully expanded (fully extended) positions. In another non-limiting arrangement, the rotation limiting arrangement allows for limited rotation of the sleeves relative to one another as the inner sleeve moves between the fully compressed (fully retracted) and fully expanded (fully extended) positions (e.g., inner sleeve rotates 0.01-5 rotations (and all values and ranges therebetween) about the longitudinal axis of the spring system as the inner sleeve moves between the fully compressed (fully retracted) and fully expanded (fully extended) positions). In one non-limiting arrangement, the rotation limiting arrangement includes a groove, slot and/or rib arrangement on the inner and/or outer sleeve to limit or control the rotation of the inner sleeve about the longitudinal axis of the spring system as the inner sleeve moves between the fully compressed (fully retracted) and fully expanded (fully extended) positions. As can be appreciated, the rotation limiting arrangement can have other configurations. When a groove, slot or rib is used, the groove, slot or rib on at least one of the inner or outer sleeves is positioned along at least 10% of a longitudinal length of the inner sleeve or outer sleeve, typically at least 30% of a longitudinal length of the inner sleeve or outer sleeve, and more typically at least along at least 55% of a longitudinal length of the inner sleeve or outer sleeve.

Figure 3:
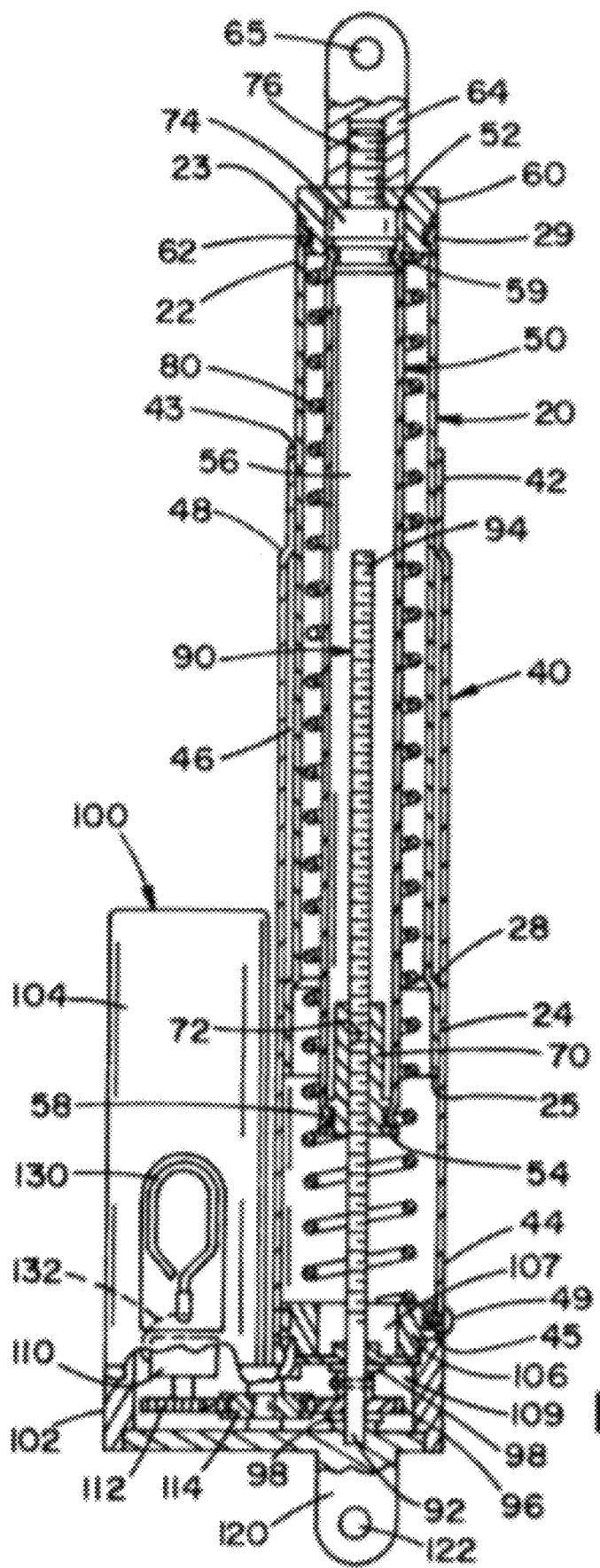
FIG. 3 is a sectional view of the spring system of FIG. 1.

The top rod 50 has a cross-sectional shape and size to pass at least partially through the internal cavity of the inner and outer sleeves. The top rod has a top end 52, a bottom end 54, and an internal cavity 56. A top bushing 60 is connected to the top end 52 of the top rod. The top bushing 60 includes a grooved region 62 that is configured to receive an indent region 29 in the top portion of the inner sleeve that is used to secure at least a portion of the top bushing in the internal cavity of the top portion of the inner sleeve. A connection arrangement 64 having an opening 65 is connected to or formed on the top of the top bushing. As illustrated in FIG. 3, the top bushing and/or connection arrangement can be threadedly connected to a top rod connector 74 that includes a threaded top 76. The top rod connector is connected in the internal cavity of the top end or top portion of the top rod by indents 59. The top bushing can be configured to form a fluid seal in the top portion of the inner sleeve when connected to the inner sleeve; however, this is not required. The size, shape, and material of the top bushing are non-limiting. Positioned in the internal cavity 56 at or near the bottom end of the top rod is a bottom rod engagement element in the form of a sleeve or nut 70. The sleeve or nut 70 is secured in the internal cavity of the top rod by indent region 58. The sleeve or nut includes a threaded central passageway 72 that is configured to receive a threaded region on the bottom rod. As can be appreciated, the sleeve or nut can have other configurations that allow the sleeve or nut to controllably move up and down a portion of the bottom rod 90 as the bottom rod rotates in a particular direction.

The spring 80 is generally shaped to be positioned in the internal cavity of the inner and outer sleeve; however, this is not required. As can be appreciated, more than one spring 80 can be positioned in the internal cavity of the inner and outer sleeve. The shape, size, the spring free length, wire type, wire thickness, cross-sectional shape of the wire, number of windings, wire material, and/or spring force of spring are non-limiting. The spring length of one or more of the springs can be greater than, less than, or equal to the longitudinal length of the internal cavity of the outer sleeve. As illustrated in FIG. 3, the spring length of spring 80 (in its free non-compressed state) is greater than the longitudinal length of the internal cavity of the outer sleeve. As can be appreciated, when two or more springs are used, such springs can be in a nested relationship. The two or more nested springs can have the same and/or a different load versus deflection curves when the rod member moves between a fully extended and fully retracted positions. The two or more nested springs can have the same and/or a different free length. The two or more nested springs can have the same and/or a different wire thickness and/or cross-sectional wire shape. The two or more nested springs can have the same and/or a different spring shape and/or cross-sectional spring shape. The two or more nested springs can be made of the same and/or a different material. The two or more nested springs can have the same and/or a different number of windings per inch. The two or more nested springs can be wound in the same or differing directions with respect to another compression spring.

The bottom portion 92 of the bottom rod 90 is rotatable connected to the drive housing 100. The top portion 94 of the bottom rod is threaded or grooved to be engageable (e.g., threadedly engageable, etc.) in the central passageway 72 of sleeve or nut 70. As illustrated in FIG. 3, the top portion of bottom rod 90 moves when the internal cavity 56 of the top rod 50 and the inner sleeve 20 moves between the fully extended and fully retracted positions. When the bottom rod rotates in a first direction, the top portion of the bottom rod extends further into the internal cavity of the top rod and thereby causes the inner sleeve to retract into the internal cavity of the outer sleeve and also causes the spring 80 to compress. When the bottom rod rotates in an opposition direction from the first direction, the top portion of the bottom rod retracts from the internal cavity of the top rod and thereby causes the inner sleeve to extend outwardly from the internal cavity of the outer sleeve and also causes the spring 80 to decompress.

The drive housing 100 includes a drive body 102 that includes a motor housing 104 for housing the motor 110 and a bottom or connection bushing 106 to connecting the bottom portion of 44 of the outer sleeve 40 to the drive housing. The motor can be controlled by a controller 196; however, this is not required. The controller (when used) is generally partially or fully located on or within the drive housing 100; however, this is not required. The connection bushing 106 can be formed as part of the drive housing or can be separately connected to the drive housing. The connection bushing includes a groove region 108 and is configured to receive the ends of one or more connection screws 49 that are inserted through a screw opening 47 in the bottom portion of the outer sleeve to thereby secure the outer sleeve to the drive housing. The connection bushing can be used to form a fluid seal with the outer sleeve; however, this is not required. The bottom surface of the drive housing can optionally include a connection arrangement 120 having an opening 122.

Referring now to FIG. 3, a gear arrangement is housed in the gear cavity 109 of the drive housing to enable the motor to cause the bottom rod to rotate. As can be appreciated, the gear arrangement is optional when the motor is directly connected to the bottom rod.

As illustrated in FIG. 3, at the end of motor 110 is a motor gear 112. A rod gear 96 is connected to the bottom end or portion 92 of the bottom rod 90. The bottom portion of the bottom rod passes through a rod opening 107 in connection bushing 106. The rod opening can be used to stabilize the position of the bottom rod along the longitudinal axis of the strut; however, this is not required. One or more flanges or washers 98 on the bottom rod can be used to inhibit or prevent the movement of the bottom rod along the longitudinal axis of the bottom rod; however, this is not required. The rod gear can directly engage the motor gear or one or more intermediate gears 114 can be positioned between the rod gear and the motor gear. The selection of the number of gears and the size of the gears can be used to create a desired gear ratio between the motor and the bottom to cause the bottom rod to rotate at a certain rpm. A controller 196 can be used to control the speed of the motor and/or the rotational direction of the motor.

A safety or quick release system can optionally be included in the drive housing. The drive housing can optionally include a manual release pull tab 130. The pull tab can be positioned at any location on the drive housing. As illustrated in FIG. 3, the pull tab is located on the motor housing. The pulling or moving of the pull tab is configured to 1) cause the motor to be moved and disengage from one or more gears in the drive housing, and/or 2) cause one or more gears in the drive housing to disengage from one another so that the motor can no longer drive the rotation of the bottom rod. The configuration of this release arrangement is non-limiting. In one non-limiting configuration, the pull tab is connected to a cable 132, which in turn is connected to the motor or to one or more gears (motor gear, intermediate gear, and/or rod gear) to cause the motor and/or one or more gears to be displaced (e.g., move upwardly, move downwardly, move laterally, etc.) from its engagement position to a non-engagement position, thereby preventing the motor to continue to drive the rotation of the bottom rod. The displaced motor and/or one or more gears can be configured to be manually repositioned into its engagement position or automatically move to its engagement position after the pull tab is released (e.g., motor and/or gear biased in the engagement position, etc.) or after some certain time period has transpired; however, this is not required.

Figure 3A:
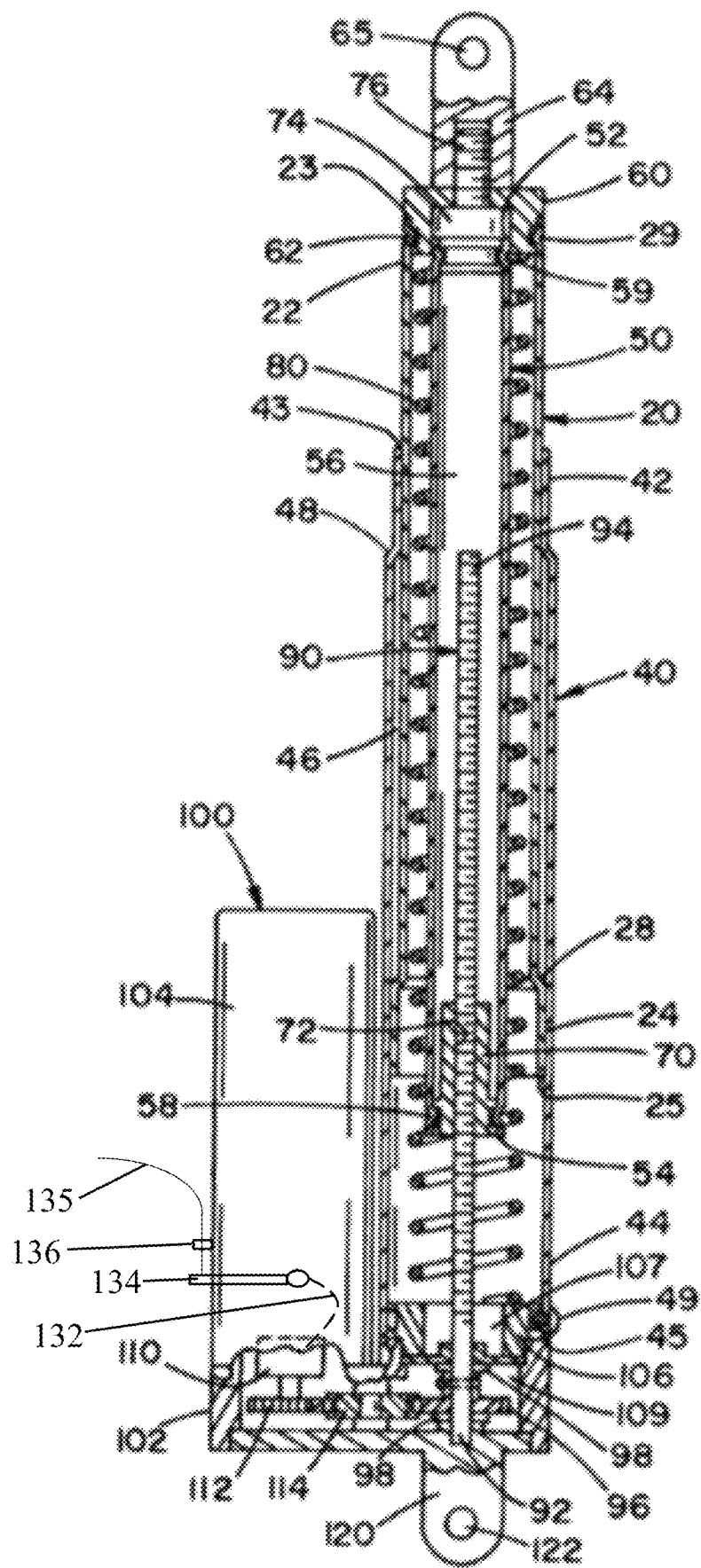
FIG. 3A is one alternative sectional view of the spring system of FIG. 1.

Referring now to FIG. 3A, an alternative safety or quick release system is illustrated. The optional manual release pull tab 130 can be optionally replaced with a release lever 134. The release lever 134 is configured to pivot between a release position and an engagement position. The release lever 134 can be optionally biased in the release position or the engagement position. One end of the release level is connected to cable 132, which in turn is connected to the motor or to one or more gears (motor gear, intermediate gear, and/or rod gear) to cause the motor and/or one or more gears to be displaced (e.g., move upwardly, move downwardly, move laterally, etc.) from its engagement position to a non-engagement position when the release lever 134 is moved to the release position, thereby preventing the motor to continue to drive the rotation of the bottom rod. The displaced motor and/or one or more gears can be configured to be repositioned into its engagement position or automatically moved to its engagement position after the release lever 134 is moved to the engagement position (e.g., release lever and/or motor and/or gear biased in the engagement position, etc.) or after some certain time period has transpired; however, this is not required. The release lever 134 can be moved by use of a release cable 135 that is connected to the release lever 134. The release cable 135 can be configured to be pulled manually and/or by some other mechanism. An optional cable guide 136 is illustrated as being connected to the drive housing 100. A portion of the release cable 135 is movable positioned in an opening or slot (not shown) to cause one end of the release lever 134 to move toward the cable guide 136 when the release cable 135 is pulled.

Figure 3B:
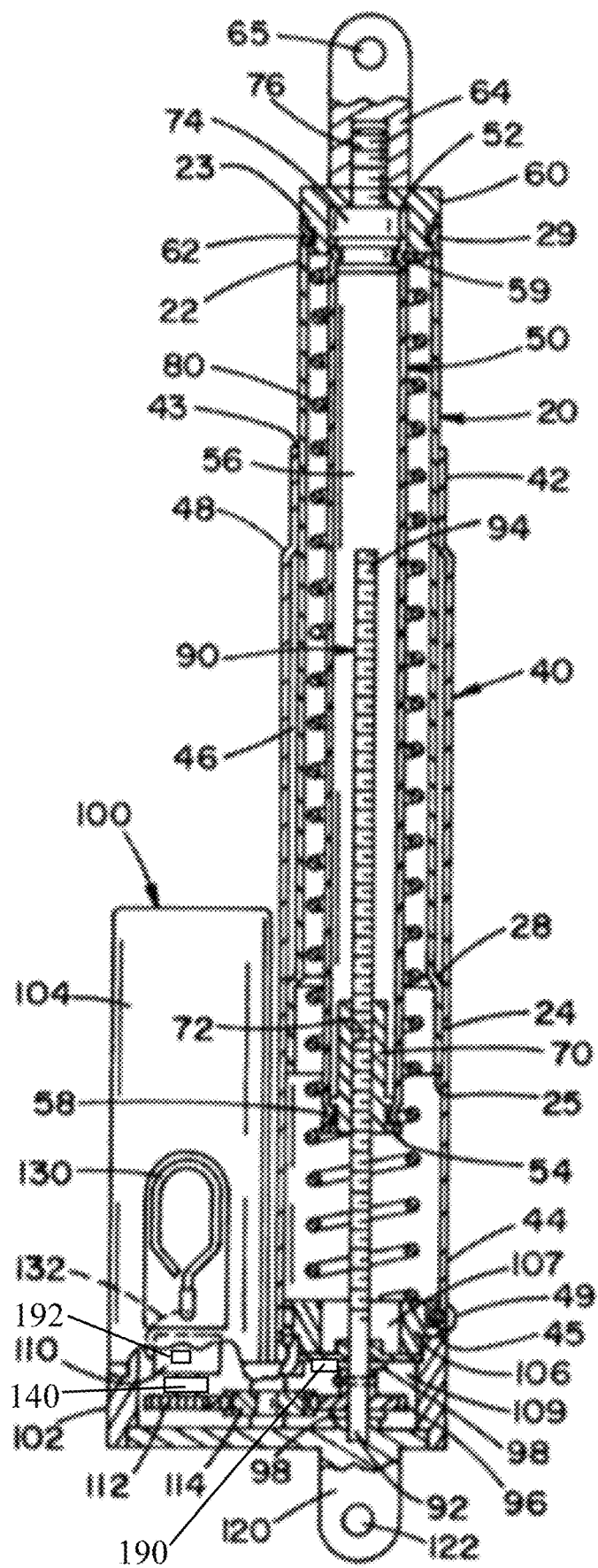
FIG. 3B is another an alternative sectional view of the spring system of FIG. 1.

Referring now to FIG. 3B, the safety or quick release system can optionally include a solenoid/electromagnetic clutch 140. The solenoid/electromagnetic clutch 140 cause the motor and/or one or more gears to be displaced (e.g., move upwardly, move downwardly, move laterally, etc.) from its engagement position to a non-engagement position when the solenoid/electromagnetic clutch 140 is activated or deactivated. The spring system 10 can include a controller 196 that can be optionally connected to the solenoid/electromagnetic clutch 140 to control the operation of the solenoid/electromagnetic clutch 140. The controller (when used) is generally located in the drive housing 100; however, this is not required. The solenoid/electromagnetic clutch 140 can be positioned in the engagement position when not activated or in the non-engagement position when not activated. In the engagement position, the motor is able to drive the rotation of the bottom rod 90. In the non-engagement position, the motor is unable to drive the rotation of the bottom rod 90. The controller can optionally be configured to automatically activate/deactivate the solenoid/electromagnetic clutch 140 when a certain event has been sensed or occurred (e.g., detection of too high temperature, detection of too high humidity, detection of smoke, detection of certain gasses (e.g., explosive and/or highly volatile gasses), loss of network connection, detection of too high pressure, too high of torque detected, etc.). The controller can optionally be configured to receive a signal (wired and/or wireless) to cause the controller to activate/deactivate the solenoid/electromagnetic clutch 140.

In each of the safety or quick release systems illustrated in FIGS. 3-3B, the bottom rod 90 is allowed to freely rotate when the motor is no longer engaged with and/or driving the top or bottom rod as the spring system moves between the fully retracted and fully extended positions. As such, when the inner sleeve moves between the fully extended and fully retracted positions, sleeve or nut 70 causes bottom rod 90 to rotate as the sleeve or nut 70 moves along the longitudinal length of the bottom rod 90. As such, the spring system is still able to operate by only the one or more springs 80 that are located in the inner and/or outer sleeves. As can be appreciated, one or more gears, belts, clutch parts, etc., may also freely rotate when the motor is no longer engaged with and/or driving the bottom rod 90 as the spring system moves between the fully retracted and fully extended positions.

As illustrated in FIGS. 3-3B, when the free length of at least one of the springs is greater than the longitudinal length of the outer sleeve, the spring system, when no downward force is applied to the upper sleeve, will move to a partial or full extension position when the motor is no longer engaged with and/or driving the top or bottom rod. The sleeve or nut 70 and the threading on the bottom rod 90 can be selected to increase or reduce the ease to which the bottom rod 90 rotate in the sleeve or nut 70 as the sleeve or nut moves along the longitudinal length of the bottom rod 90.

As can be appreciated, any of the safety or quick release systems illustrated in FIGS. 3, 3A, and 3B can be used in any of the spring systems illustrated in FIGS. 1-7.

Figure 1A:
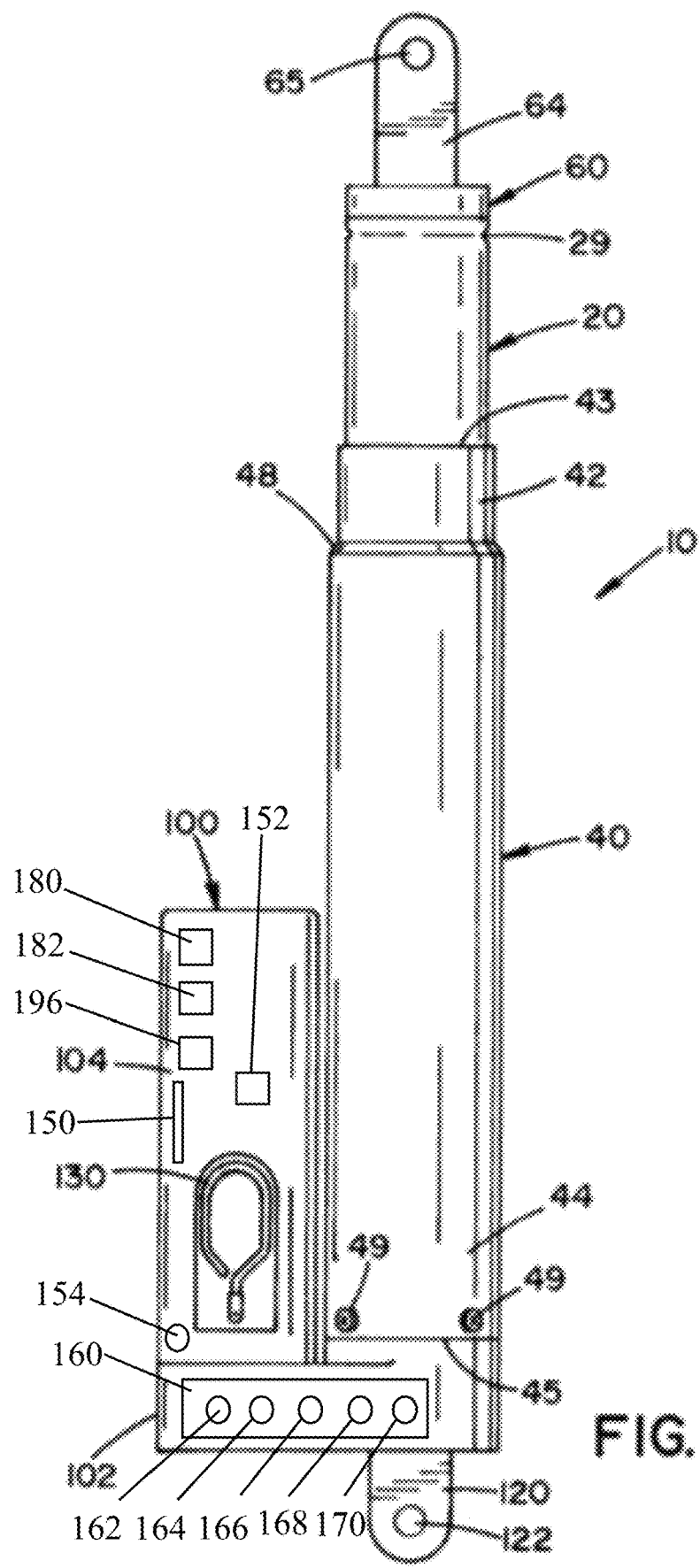
FIG. 1A is a side plan view of the spring system according to another non-limiting embodiment.
Figure 2:
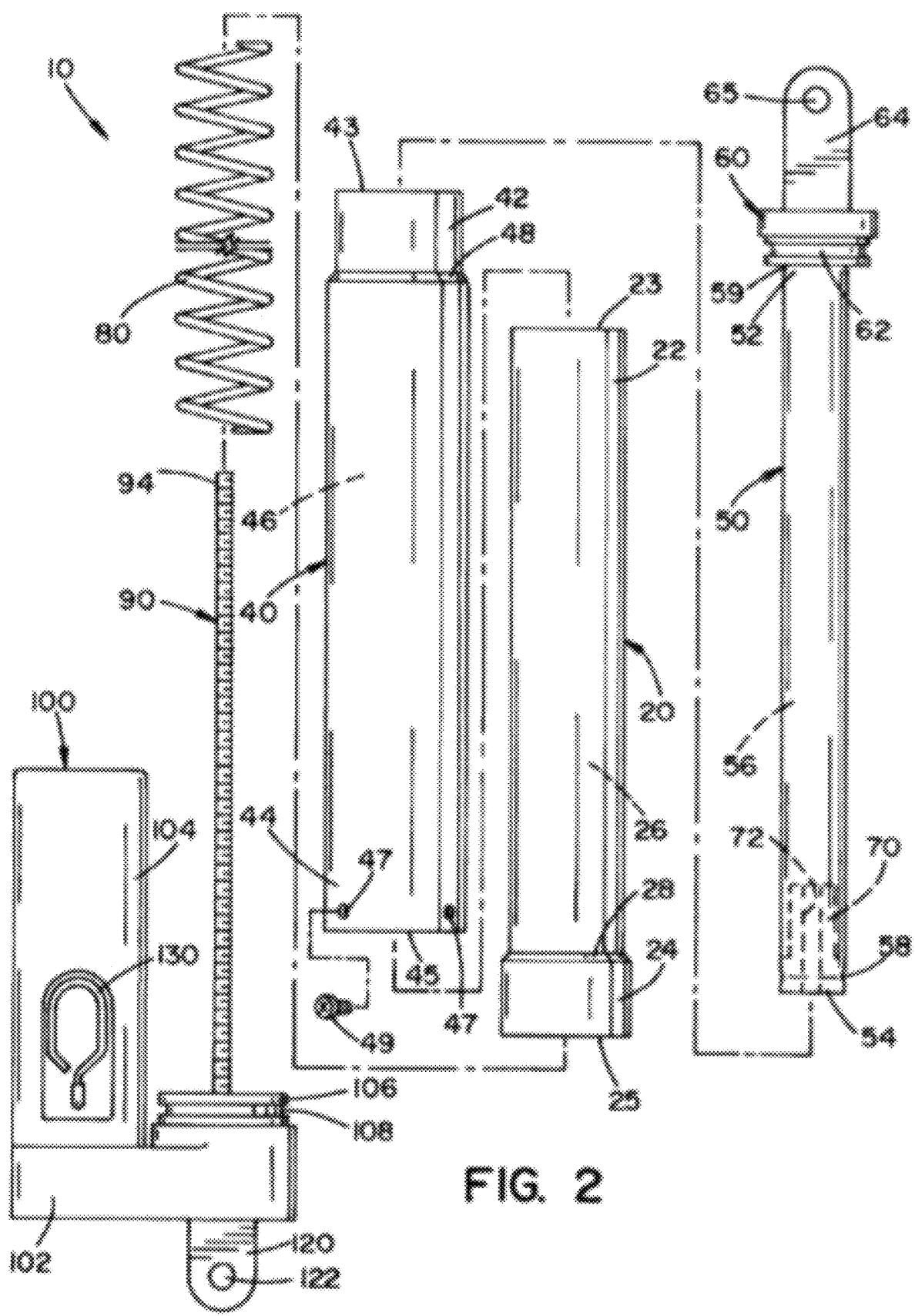
FIG. 2 is an exploded view of the spring system of FIG. 1.

Referring now to FIGS. 1A and 3B, the spring system 10 can optionally include one or more sensors. As illustrated in FIG. 1A, the spring system 10 optionally includes an inclinometer sensor/probe 150 to measure the angle/inclination of the spring system when installed and/or during use. The inclinometer sensor/probe monitors proper orientation and/or operation of the spring system. If improper orientation and/or operation of the spring system is detected, the spring system can be 1) locked, 2) the motor disengaged, and/or 3) the spring system moved to a certain position (e.g., fully extended position, fully retracted position, some intermediate position). The inclinometer sensor/probe (when used) can be partially or fully located on or within the drive housing 100 and/or in and/or on one or more sleeves; however, this is not required. The inclinometer sensor/probe can be connected to a controller; however, this is not required.

The spring system 10 illustrated in FIG. 1A optionally includes a motion sensor and/or camera 152. The motion sensor (when used) measures and/or detects the motion of the spring system and/or detects motion about the spring system. The camera (when used) views the operation of the spring system and/or views the environment about the spring system. If improper motion is detected, the spring system can be 1) locked, 2) the motor disengaged, and/or 3) the spring system moved to a certain position (e.g., fully extended position, fully retracted position, some intermediate position). The motion sensor and/or camera can be partially or fully located on or within the drive housing 100 and/or in and/or on one or more sleeves; however, this is not required. The motion sensor and/or camera can be connected to a controller; however, this is not required.

The spring system 10 illustrated in FIG. 1A optionally includes a visual and/or sound device 154. The visual and/or sound device (when used) indicates the proper operation of the spring system (e.g., green light, etc.) and/or the improper operation of the spring system (e.g., red light, alarm sound, etc.). The visual and/or sound device can be partially or fully located on or within the drive housing 100 and/or in and/or on one or more sleeves; however, this is not required. The visual and/or sound device can be connected to a controller; however, this is not required.

The spring system 10 illustrated in FIG. 1A is also illustrated as optionally including an environmental sensor junction block 160 that includes one or more sensors. Such sensors can optionally include a temperature sensor 162, a humidity sensor 164, a gas sensor 166, a debris sensor 168 and/or a smoke sensor 170. If one or more of the sensors senses and/or detects an improper and/or undesired parameter, the spring system can be 1) locked, 2) the motor disengaged, and/or 3) the spring system moved to a certain position (e.g., fully extended position, fully retracted position, some intermediate position). The one or more sensors of the environmental sensor junction block 160 can be partially or fully located on or within the drive housing 100 and/or in and/or on one or more sleeves; however, this is not required. The one or more sensors of the environmental sensor junction block 160 can be connected to a controller; however, this is not required.

As illustrated in FIG. 1A, the spring system 10 can optionally include a global position system (GPS) 180. The GPS can be used to obtain positioning information of the spring system. The GPS can be partially or fully located on or within the drive housing 100 and/or in and/or on one or more sleeves; however, this is not required. The GPS can be connected to a controller; however, this is not required.

As illustrated in FIG. 1A, the spring system 10 can optionally include a wireless transmitter/receiver 182. The wireless transmitter/receiver transmits and/or receives information between the spring system and a remote location. The wireless transmitter/receiver can be partially or fully located on or within the drive housing 100 and/or in and/or on one or more sleeves; however, this is not required. The wireless transmitter/receiver can be connected to a controller; however, this is not required.

As illustrated in FIG. 3B, the spring system 10 can optionally include a pressure sensor 190. The pressure sensor detects the pressure in the one or more sleeves of the spring system. If pressure sensor senses and/or detects an improper and/or undesired pressure, the spring system can be 1) locked, 2) the motor disengaged, and/or 3) the spring system moved to a certain position (e.g., fully extended position, fully retracted position, some intermediate position). The pressure sensor can be partially or fully located on or within the drive housing 100 and/or in and/or on one or more sleeves; however, this is not required. The pressure sensor can be connected to a controller; however, this is not required.

As illustrated in FIG. 3B, the spring system 10 can optionally include a torque sensor 192. The torque sensor detects the torque of the motor during the operation of the motor. If the torque sensor senses and/or detects a too high and/or too low of torque, the spring system can be 1) locked, 2) the motor disengaged, and/or 3) the spring system moved to a certain position (e.g., fully extended position, fully retracted position, some intermediate position). The torque sensor can be partially or fully located on or within the drive housing 100; however, this is not required. The torque sensor can be connected to a controller; however, this is not required.

As can be appreciated, any of the sensors, wireless transmitter/receiver, global position system (GPS), motion sensor and/or camera, and/or visual and/or sound device can be used in any of the spring systems illustrated in FIGS. 1-7.

Figure 4:
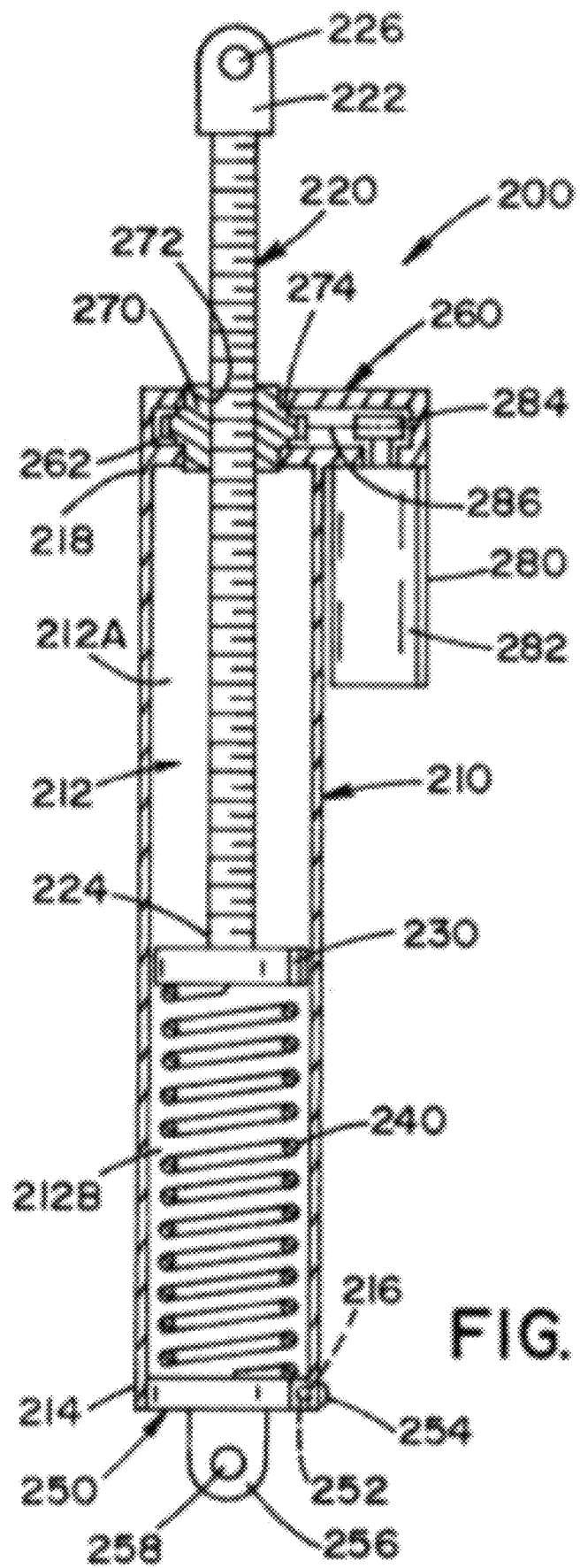
FIG. 4 is a sectional view of another non-limiting embodiment of the spring system in accordance with the present disclosure.

As illustrated in FIGS. 3, 3A, and 3B, top rod 50 has a longitudinal length that is greater that the longitudinal length of the internal cavity of the top rod; however, it can be appreciated that the top rod has a longitudinal length that is equal to or less than the longitudinal length of the internal cavity of the top rod. Although not shown, it can be appreciated that the top rod could include a piston so that one or more mechanical springs can be located above and/or below the piston. A representative arrangement wherein in one or more mechanical springs can be located above and/or below the piston is illustrated in FIGS. 4-6. Such a spring arrangement can be used in the spring system of FIGS. 1-3B if one or more pistons are included on the top rod. As can also be appreciated, a bushing (e.g., a metal bushing, etc.) can optionally be positioned at or near the interface between the inner and outer sleeve. Such a bushing (when used) can be used so that one or more mechanical springs can be located above and/or below the bushing. A representative arrangement wherein in one or more mechanical springs can be located above and/or below the bushing is illustrated in FIGS. 4-6.

Referring now to FIGS. 4-6, additional non-limiting embodiments of the disclosure are illustrated. In each of the embodiments illustrated in FIGS. 4-6, the drive housing is positioned at the top portion of the spring system whereas the drive housing of the spring system of FIGS. 1-3B was located at the bottom portion of the spring system.

Referring now to FIG. 4, the spring system 200 includes a one-piece tubular housing 210 and a rod member 220 which is axially extendable and retractable relative to the housing. The rod member has a top end 222 and a bottom end 224 that is connected to a piston 230. The piston divides the internal chamber 212 of the housing into a top chamber 212A and a bottom chamber 212B. Although not shown, the housing and/or rod member can optionally include a rotation limiting arrangement that inhibits or prevents the rotation of the housing relative to the rod member. Such a rotation limiting arrangement ensures that the rod member substantially moves or only moves along the longitudinal axis of the housing and has little or no rotational movement about the longitudinal axis of the housing when the rod member moves between the fully compressed (fully retracted) and fully expanded (fully extended) positions. In one non-limiting arrangement, the rotation limiting arrangement inhibiting or preventing the rotation of the rod member relative to the housing includes a groove, slot, and/or rib arrangement on the rob member and/or housing. When a groove, slot, or rib is used, the groove or rib on at least one of the rod member or housing is positioned along at least 10% of a longitudinal length of the rod member or housing, typically at least 30% of a longitudinal length of the rod member or housing, and more typically at least along at least 55% of a longitudinal length of the rod member or housing.

As illustrated in FIG. 4, a compression spring 240 is located in bottom chamber 212B. As illustrated in FIG. 5, compression spring 240 is located in top chamber 212A. As illustrated in FIG. 6, compression spring 240 is located in top chamber 212A and a second compression spring 242 is located in bottom chamber 212B. As can be appreciated, more than one compression spring can be located in top chamber 212A and/or bottom chamber 212B. As illustrated in FIGS. 5 and 6, compression spring 240 encircles at least a portion of rod member 220. When two of more compression springs are located in the top chamber and/or the bottom chamber, such springs can be positioned in a nested relationship. The two or more nested springs can have the same and/or a different load versus deflection curves when the rod member moves between a fully extended and fully retracted positions. The two or more nested springs can have the same and/or a different free length. The two or more nested springs can have the same and/or a different wire thickness and/or cross-sectional wire shape. The two or more nested springs can have the same and/or a different spring shape and/or cross-sectional spring shape. The two or more nested springs can be made of the same and/or a different material. The two or more nested springs can have the same and/or a different number of windings per inch. The two or more nested springs can be wound in the same or differing directions with respect to another compression spring.

The top end of rod member 220 can include a connection arrangement 222 having an opening 224. The bottom end or portion 214 of housing 210 can include a bottom bushing 250. The bottom bushing can optionally include a groove region or opening 252 that is configured to receive the ends of one or more connection screws 254 that are inserted through a screw opening 214 in the bottom portion of the housing to thereby secure the bottom bushing to the housing. The connection bushing can be used to form a fluid seal with the outer sleeve; however, this is not required. The bottom bushing can include a connection arrangement 256 having an opening 258.

The drive housing 260 can be formed on or connected to the top end 218 of the housing 210. The drive housing includes a rod engagement element that can optionally be in the form of a a sleeve or nut 270. The sleeve or nut 270 includes a threaded central passageway 272. As can be appreciated, the sleeve or nut can have other configurations. Sleeve or nut 270 is positioned in a nut cavity 262 of the drive housing. The nut cavity is configured to enable the sleeve or nut to rotate about the longitudinal axis of central opening 272. The sleeve or nut can optionally include one or more side flanges 274 or other similar structures to maintain the position and stability of the sleeve or nut as it rotates in the nut cavity. The sleeve or nut can be configured to form a fluid seal with the drive housing; however, this is not required. As illustrated in FIGS. 4-6, the threaded portion of connection rod 220 passes through threaded central passageway 272 of sleeve or nut 270. When the sleeve or nut is rotated in a first direction, the connection rod 220 is caused to extend outwardly from the housing. When the sleeve or nut is rotated in a direction opposite the first direction, the connection rod 220 is caused to retract into the internal cavity of the housing.

The drive housing includes a motor housing 280 that includes a motor 282. The motor can be connected or interconnected to the sleeve or nut by a gear system, belts, etc. As illustrated in FIGS. 4-6, the end of motor 282 includes a grooved belt wheel 284 that retains a belt 286. When the motor is activated, the belt wheel is caused to rotate, which in turn causes the belt to move about the belt wheel and cause the sleeve or nut to rotate in the nut cavity. The type of motor that can be used can be similar to the type of motor described in FIGS. 1-3B. The drive housing can optionally include a safety or quick release system that causes the motor to disengage from the sleeve or nut. If the drive housing includes a gear system to drive the sleeve or nut, the safety or quick release system can be the same or similar to the safety or quick release system as described with respect to FIGS. 1-3B. If a belt or chain is used to drive the sleeve or nut, the safety or quick release system can be configured to cause the desired disengagement of the motor from driving the rotation of the sleeve or nut.

As illustrated in FIGS. 1-6, the longitudinal axis of the motor is parallel to the longitudinal axis of the outer sleeve or housing; however, it can be appreciated that the longitudinal axis of the motor can be normal to the longitudinal axis of the outer sleeve or housing or at some other angle relative to the longitudinal axis of the outer sleeve or housing.

Figure 7:
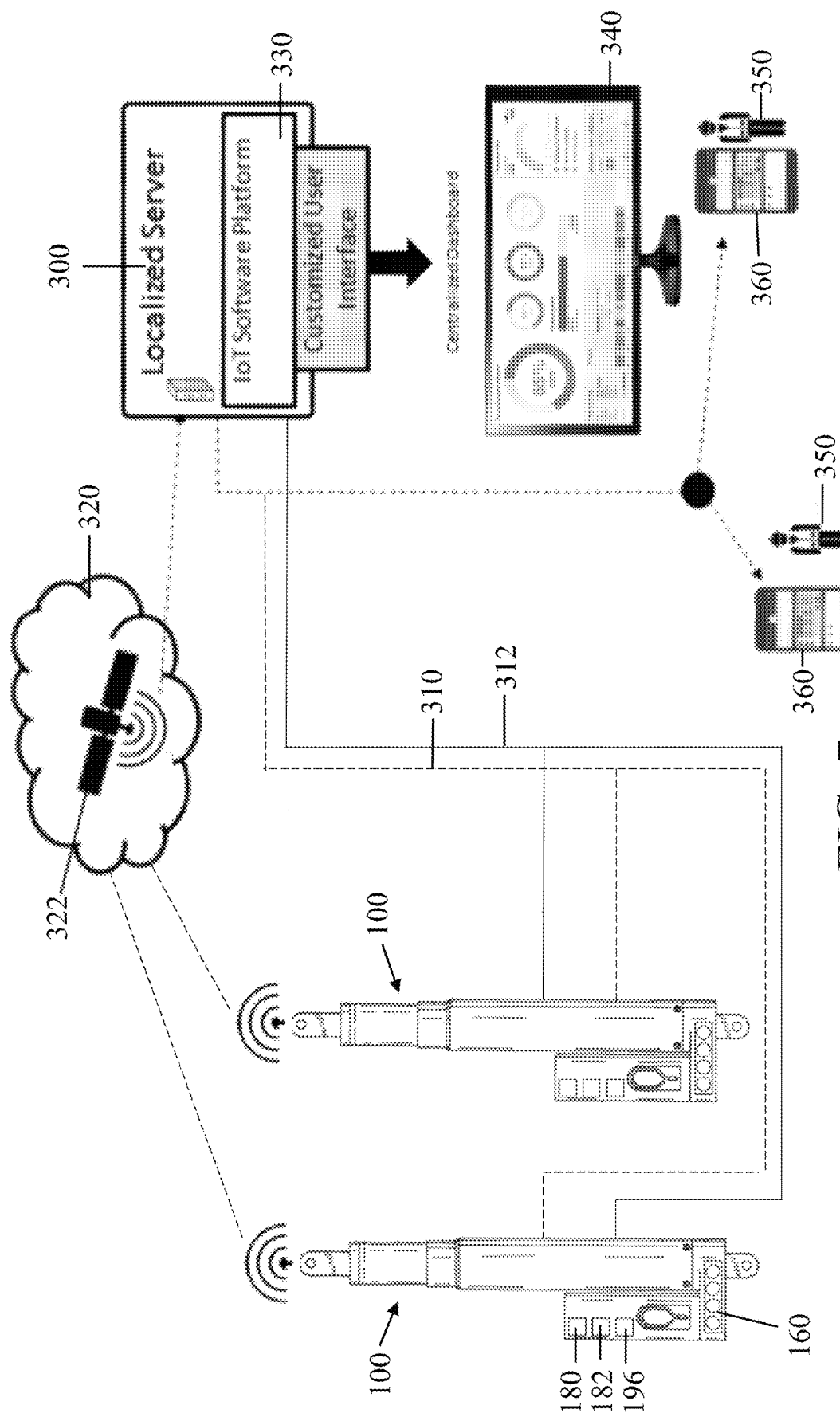
FIG. 7 is an illustration of one or more spring systems being remotely monitored and/or controlled; and, FIG. 8 is a flow chart of a method for monitoring and/or controlling one or more spring systems in accordance with the present disclosure.
Figure 8:
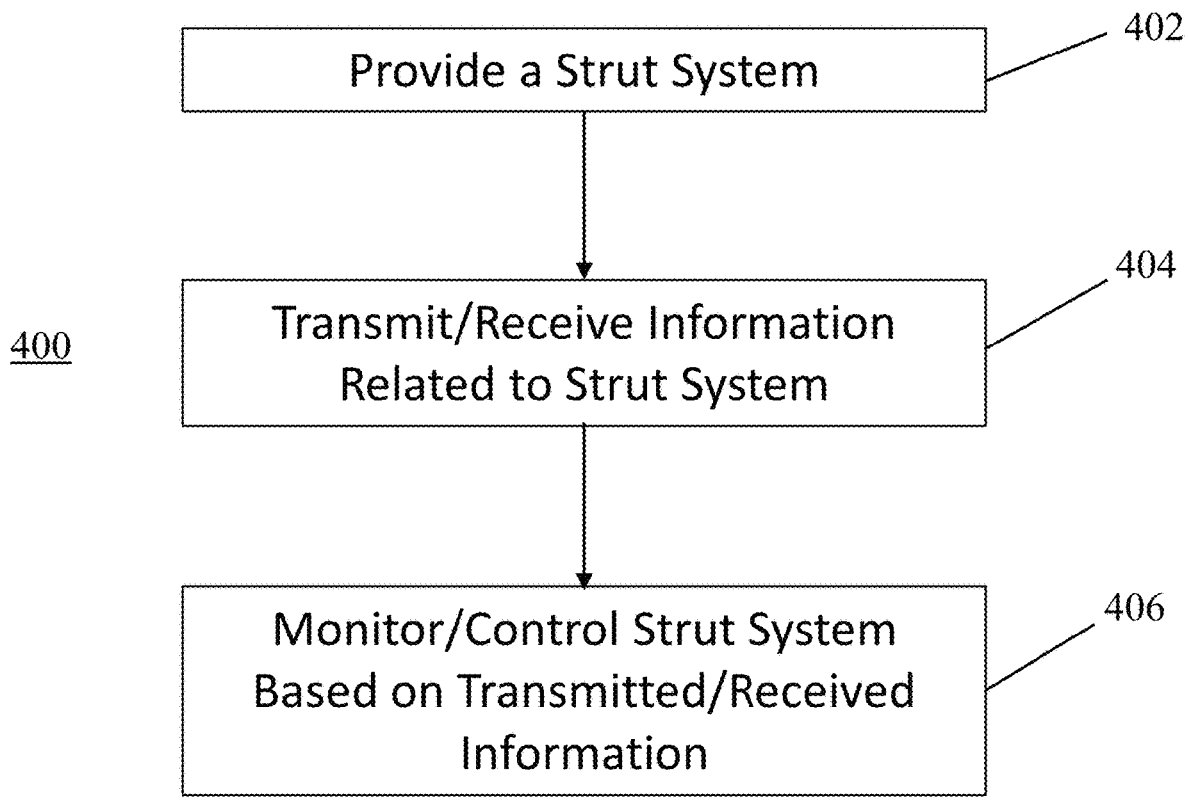

Referring now to FIG. 7, the spring system 100 can optionally include various hardware components including, but not limited to, a controller 196, one or more sensors 160, a transmitter/receiver (e.g., communication interface) 182, and an optional GPS 180. The one or more sensors, transmitter/receiver, and optional GPS are generally in electronic communication with the controller. As can be appreciated, spring system 200 can be substituted for the spring system 100 in FIG. 7.

The controller 196 generally includes one or more processors that may be any of various commercially available processors. The one or more processors may be variously embodied, such as by a single-core processor, a dual-core processor (or more generally by a multiple-core processor), a digital processor and cooperating math coprocessor, a digital controller, or the like. In some embodiments, the one or more processors, in addition to controlling the operation of the spring system 100, executes instructions stored in an associated memory for performing the one or more operations outlined more fully below.

The one or more sensors 160 are generally in electronic communication with the controller 196. The one or more sensors are design/configured to detect a) one or more operating parameters and/or status of the spring system, b) the location and/or position of the spring system, c) the environment in and/or about the spring system, and/or d) any other feature of the spring system that is desirable to monitor and/or sense. The information from the one or more sensors can optionally be processed by the controller. For example, one of the sensors can be a position sensor that is able to sense the position of the inner sleeve as it moves between the fully extended and fully retracted positions. The position sensor can generate position data which is processed by the controller. The position sensor (when used) may be a capacitive transducer, a capacitive displacement sensor, a magnetic sensor, gyroscope, an optical sensor, camera, and/or other sensor known in the art that may generate position data. As can be appreciated, other or additional sensor can be present on the spring system (e.g., temperature sensor, a humidity sensor, a gas sensor, a debris sensor, a smoke sensor, loss of power sensor, network status/interruption sensor, torque sensor, power sensor, inclination sensor, optical sensor, etc.).

The communication interface 182 (e.g., transmitter and/or receiver) includes circuitry for transmitting data to localized data server 300 via known methods including, but not limited to, RF transmission, cellular transmission, satellite transmission etc. In some embodiments, the communication interface may also receive data transmitted from a server or remote user device. In some embodiments, application software is executed by the controller for communicating data to the communication interface from where it is transmitted to a localized server 300 via a communications infrastructure having one or more communications networks such as a cellular network, satellite network, Internet, Ethernet, intranet, local area network (LAN), wide area network (WAN), etc., operating according to one or more communications protocols, such as CDMA, TDMA, 3G, Internet protocol, Bluetooth, etc. Data that is transmitted to the localized data server can be stored, analyzed, modified, etc. Such data can be used to monitor the spring system and/or to control the operation of the spring system.

In some non-limiting embodiments, the communication interface 182 is configured to send and/or receive data and/or signals to and/or from a localized data server 300. In some embodiments, the communication interface 182 is directly coupled to a LAN 310, 312. The LAN connection can be a wireless connection 310 and/or a wired connection 312. In other non-limiting embodiments, the communication interface 182 is in wireless communication with a WAN 320, such as for example and without limitation, the internet. The communication via the WAN 320 may optionally be facilitated by a satellite network 322. In these non-limiting embodiments, the localized server 300 is configured to receive the data transmitted from the communication interface 182 via a connection to the wide area network 320.

The data from the one or more sensors that is transmitted by the communication interface 182 can be particularly useful in large-scale systems where multiple strut systems are managed. As can be appreciated, other types of data can be transmitted by the communication interface 182 (e.g., status of motor, status of clutch/coupling mechanism, service time of spring system, operation time of motor, gear ratio of spring system, sensor status, time, date, model number, serial number, communication protocol settings, password settings, security protocol settings, current operation parameters, current location, etc.).

In some non-limiting embodiments, the communication interface 196 is a plug-and-play type card or other type of memory card having an associated interface processor and interface memory. The processor may execute preprogrammed application software stored within the interface memory for receiving data and communicating such data to the localized data server 300 via one or more communications networks. The communication interface 196 may include additional known hardware, for example, an antenna, RF transmission means, modem, telephone connectors, Ethernet connectors, broadband connections, DSL connections, etc., for transmitting and/or receiving data.

The localized data server 300 may be a personal computer or other known device that hosts a software platform 330. The software platform 330 may be an Internet of Things (IoT) platform that is available off the shelf, modified, or designed in-house. The localized data server 300 optionally includes at least one user interface or display 340 configured to present the data of one or more spring systems 100 to a user 350. It will be appreciated that the localized server 300 may be connected to a LAN 310, 312 and include any hardware, software, or combinations thereof, capable of implementing the systems and methods described herein. Suitable examples of such hardware include, without limitation, processors, hard disk drives, volatile and non-volatile memory, a system bus, user interface components, display components, and the like. It will further be appreciated that multiple such devices may be used as the server 300 in accordance with the subject disclosure.

In some non-limiting embodiments, the localized data server 300 is configured to wirelessly communicate with at least one remote device 360 on the LAN 310. The at least one remote device 360 may be a smartphone, tablet, or other portable user interface device. The remote device 360 can be configured to receive and present data of a user-selected spring system 100. Additionally, the remote device 360 may provide alerts to a user 350 upon receiving data related to a changed state of the spring system.

In some non-limiting embodiments, a user interface 340 (for example, a personal computer) may be used to input system commands, requests, changes, etc., to one or more of the spring systems 100. While illustrated as a touch-screen-enabled display screen device for receiving input, the user interface may also include other input devices such as a computer mouse and/or computer keyboard.

In some non-limiting embodiments, remote device 360 may be used to input system commands, request, changes, etc., to one or more of the spring systems 100.

In some non-limiting embodiments, electrical power is supplied to the spring system 100 via a direct power source (e.g., 12-volt power source, 120-volt power source, 220-volt power source, etc.). In other non-limiting embodiments, the spring system can be partially or fully powered by a solar regenerative panel, battery, or other means known in the art.

In some non-limiting embodiments, the communication interface 196 includes a short link radio module (e.g. a Bluetooth® module, Wi-Fi, Zigbee, etc.) for exchanging data over short distances (using short-wavelength UHF radio waves). For instance, a Bluetooth communication interface may be used to detect the presence of other devices similarly equipped with a Bluetooth® module. That is, the Bluetooth module may receive, transmit, and/or process signals from/ to a mobile communication device (such as user device 360) within a short distance from the communication interface 196. In some non-limiting embodiments, when a user device 360 is within communication range of the communication interface 196, the communication interface 196 may optionally automatically connect to the user device 360, or connect after security protocols and/or passwords have been entered and verified. In some non-limiting embodiments, the communication range is from about 1 foot to about 100 feet (and all values and ranges therebetween). In more particular non-limiting embodiments, the communication range is less than about 35 feet. In even more particular non-limiting embodiments, the communication range is about 10 feet. The user interface 360 may be equipped with a software application such that when short-link communications are established (e.g. when the user interface is within the communication range), the user interface 360 may control various commands of the spring system 100. In some non-limiting embodiments, a Bluetooth-linked user interface 360 may control/monitor the spring system 100.

In accordance with another aspect of the present disclosure, there is provided a non-limiting method 400 for monitoring/controlling one or more spring systems 100. The method 400 includes step 402, providing a spring system 100 of FIGS. 1-7. The spring system includes one or more sensors, a controller, and a communication interface (e.g., transmitter and/or receiver).

The method, at 604, includes generating data/information regarding the spring system and/or the environment about the spring system. That is, the controller is in communication with one or more sensors, and the controller sends data/information via the communication interface and/or received information via the communication interface. The transmitted and/or received information can be transmitted to and/or received from a server 300 and/or a user device 360. In some non-limiting embodiments, the spring system 100 and server 300 are both connected to the same LAN 310, 312. In other non-limiting embodiments, the communication interface 196 and local server 300 are both configured to communicate with a WAN 320, such as the Internet.

The method further includes, at 606, displaying data about one or more spring systems on a user interface 340, 360. In some non-limiting embodiments, the user interface 340, 360 is configured to alert a user to a change in the spring system 100. In some non-limiting embodiments, the user interface 340, 360 is configured enable the user to control and/or change one or more aspects of the spring system 100.

In embodiments wherein multiple spring systems are monitored, for each similarly configured to spring system 100, identification data (e.g., GPS location data, serial number, model number, company information, plant information, etc.) regarding the spring system can be transmitted by the communication interface 196 to server 300 and/or a user device 360. The user interface may display such identification data of each of the multiple spring systems. In some embodiments, a user 350 may manipulate the user interface (software) such that data regarding a particular spring system may be viewed.

While considerable emphasis has been placed herein on the structures and configurations of the preferred embodiments of the disclosure, it will be appreciated that other embodiments, as well as modifications of the embodiments disclosed herein, can be made without departing from the principles of the disclosure. These and other modifications of the preferred embodiments, as well as other embodiments of the disclosure, will be obvious and suggested to those skilled in the art from the disclosure herein, whereby it is to be distinctly understood that the foregoing descriptive matter is to be interpreted merely as illustrative of the present disclosure and not as a limitation thereof.

What is claimed:

1. A spring system that comprises:
a top sleeve having an internal chamber;
a bottom sleeve having an internal chamber and arranged for sliding displacement relative to said top sleeve; said top and bottom sleeves slidably connected together;
a top rod at least partially positioned in said internal chamber of said top sleeve and connected to said internal chamber of said top sleeve; said top rod connected to said top sleeve such that said top rod does not rotate more than 90° about a central axis of said internal chamber relative to said top sleeve; said top rod including an internal cavity and a bottom rod connector secured in said internal cavity; said bottom rod connector including an opening;
a bottom rod at least partially positioned in said internal chamber of said bottom sleeve and connected to said internal chamber of said bottom sleeve; said bottom rod rotatably connected to said top rod; a top portion of said bottom rod extending into said internal cavity of said top rod and configured to move within said internal cavity when said top sleeve moves between extended and retracted positions, said bottom rod not connected to said top sleeve; said bottom rod connector connected to a rod connection portion of said bottom rod;
a mechanical spring positioned in said internal chamber of said bottom sleeve; said internal chamber of said top sleeve; or combinations thereof; and,
a drive system; said drive system including a base mount, a motor, a motor housing, a gear drive system, and a drive disengagement arrangement; said base mount connected to a bottom portion of said bottom sleeve; said motor at least partially positioned in said motor housing; said drive system interconnecting said motor to said bottom rod to enable said motor to cause rotation of said bottom rod; said gear drive system including one or more gears; said drive disengagement arrangement including a release arrangement that is a manually activated mechanism disposed on the motor housing configured to cause said motor to no longer cause rotation of said bottom rod;
said release arrangement configured to cause a) said motor to be displaced to a motor non-engagement position when said drive disengagement arrangement is activated and/or b) one or more components of said gear drive system to be displaced to a drive non-engagement position when said drive disengagement arrangement is activated;
wherein said top and bottom sleeves continue to be slidably displaceable relative to one another after said drive disengagement arrangement is activate;
wherein rotation of said bottom rod in a first direction causes said top rod to move in a direction that causes said top sleeve to move to the extended position; and
wherein rotation of said bottom rod in a direction opposite said first direction causes said top rod to move in a direction that causes said top sleeve to move to the retracted position.

2. The spring system as defined in claim 1, wherein said bottom rod is configured to rotate as said top sleeve moves between said extended position and said retracted position while said drive disengagement arrangement is activated and not activated.

3. The spring system as defined in claim 1, wherein said spring system remains operable and continues to provide a counterbalance force via said mechanical spring after said drive disengagement arrangement is activated.

4. A spring system that comprises:
a top sleeve having an internal chamber;
a bottom sleeve having an internal chamber and arranged for sliding displacement relative to said top sleeve; said top and bottom sleeves slidably connected together:
a top rod at least partially positioned in said internal chamber of said top sleeve and connected to said internal chamber of said top sleeve; said top rod connected to said top sleeve such that said top rod does not rotate more than 90° about a central axis of said internal chamber relative to said top sleeve; said top rod including an internal cavity and a bottom rod connector secured in said internal cavity; said bottom rod connector including an opening;
a bottom rod at least partially positioned in said internal chamber of said bottom sleeve and connected to said internal chamber of said bottom sleeve; said bottom rod rotatably connected to said top rod; a top portion of said bottom rod extending into said internal cavity of said top rod and configured to move within said internal cavity when said top sleeve moves between extended and retracted positions; said bottom rod not connected to said top sleeve; said bottom rod connector connected to a rod connection portion of said bottom rod;
a mechanical spring positioned in said internal chamber of said bottom sleeve; said internal chamber of said top sleeve; or combinations thereof; and,
a drive system; said drive system including a base mount, a motor, a motor housing, a gear drive system, and a drive disengagement arrangement; said base mount connected to a bottom portion of said bottom sleeve; said motor at least partially positioned in said motor housing; said drive system interconnecting said motor to said bottom rod to enable said motor to cause rotation of said bottom rod; said gear drive system including one or more gears; said drive disengagement arrangement including a release arrangement configured to cause said motor to no longer cause rotation of said bottom rod; said release arrangement configured to cause a) said motor to be displaced to a motor non-engagement position when said drive disengagement arrangement is activated and/or b) one or more components of said gear drive system to be displaced to a drive non-engagement position when said drive disengagement arrangement is activated;

wherein said top and bottom sleeves continue to be slidably displaceable relative to one another after said drive disengagement arrangement is activated;

wherein rotation of said bottom rod in a first direction causes said top rod to move in a direction that causes said top sleeve to move to the extended position;

wherein rotation of said bottom rod in a direction opposite said first direction causes said top rod to move in a direction that causes said top sleeve to move to the retracted position, and wherein said drive disengagement arrangement includes a solenoid clutch and clutch controller; said solenoid clutch causing said motor and/or one or more gears in said gear drive system to become displaced when said drive disengagement arrangement is activated; said controller is interfaced with said drive disengagement arrangement; said controller is programmed to cause said solenoid clutch to displace said motor and/or one or more of said gears when said drive disengagement arrangement is activated by a user of remotely activated; said controller activates said drive disengagement arrangement if a programmed condition is detected; said programmed condition including one or more conditions selected from the group consisting of detection of network interruption, detection of presence of a gas above a predefined level, detection of network interruption, detection of presence of a gas above a predefined level, detection of a temperature above a predefined level, detection of debris in air above a predefined level, detection of smoke above a predefined level. detection of debris in air above a predefined level, detection of smoke above a predefined level, detection of torque above a predefined level, detection of torque below a predefined level, and detection of humidity above a predefined level.

5. The spring system as defined in claim 4, further including a communication interface; said communication interface is configured to interface with said controller; said communication interface configured to transmit and/or receive information from and/or to a remote data device; said data device including one or more devices selected from the group consisting of a server, a computer, and a mobile smart device.

6. A spring system that comprises:
a top sleeve having an internal chamber;
a bottom sleeve having an internal chamber and arranged for sliding displacement relative to said top sleeve; said top and bottom sleeves slidably connected together;
a top rod at least partially positioned in said internal chamber of said top sleeve and connected to said internal chamber of said top sleeve; said top rod connected to said top sleeve such that said top rod does not rotate more than 90° about a central axis of said internal chamber relative to said top sleeve; said top rod including an internal cavity and a bottom rod connector secured in said internal cavity; said bottom rod connector including an opening;
a bottom rod at least partially positioned in said internal chamber of said bottom sleeve and connected to said internal chamber of said bottom sleeve; said bottom rod rotatably connected to said top rod; a top portion of said bottom rod extending into said internal cavity of said top rod and configured to move within said internal cavity when said top sleeve moves between extended and retracted positions; said bottom rod not connected to said top sleeve; said bottom rod connector connected to a rod connection portion of said bottom rod;
a mechanical spring positioned in said internal chamber of said bottom sleeve; said internal chamber of said top sleeve; or combinations thereof; and,
a drive system; said drive system including a base mount, a motor, a motor housing, a gear drive system, and a drive disengagement arrangement; said base mount connected to a bottom portion of said bottom sleeve; said motor at least partially positioned in said motor housing; said drive system interconnecting said motor to said bottom rod to enable said motor to cause rotation of said bottom rod; said gear drive system including one or more gears; said drive disengagement arrangement including a release arrangement configured to cause said motor to no longer cause rotation of said bottom rod; said release arrangement configured to cause a) said motor to be displaced to a motor non-engagement position when said drive disengagement arrangement is activated and/or b) one or more components of said gear drive system to be displaced to a drive non-engagement position when said drive disengagement arrangement is activated;

wherein said top and bottom sleeves continue to be slidably displaceable relative to one another after said drive disengagement arrangement is activates:

wherein rotation of said bottom rod in a first direction causes said top rod to move in a direction that causes said top sleeve to move to the extended position;

wherein rotation of said bottom rod in a direction opposite said first direction causes said top rod to move in a direction that causes said top sleeve to move to the retracted position, and wherein the spring system further includes a controller and a communication interface; said communication interface is configured to interface with said controller; said communication interface configured to communicate with other spring systems; said communication interface is configured to communicate constantly or intermittently with a remove data device; data that is communicated between said communication interface and said remote data device includes information selected from the group consisting of spring system properly powered, spring system connected to a network, number of cycles performed by spring system, recorded forces of said spring assembly, recorded forces of said motor, loads exerted on said spring system, diminishing or varied forces of said spring assembly, diminishing or varied forces of said motor, and recorded interference of operation of said spring system.

7. The spring system as defined in claim 1, wherein an anti-rotation arrangement on said top sleeve, said bottom sleeve, or combinations thereof prevents rotation of said top sleeve relative to said bottom sleeve when said top sleeve moves between said extended and said retracted position; said anti-rotation arrangement includes a groove or rib positioned along at least 10% of a longitudinal length of said top sleeve, said bottom sleeve; or combinations thereof.

8. The spring system as defined in claim 1, wherein said top sleeve includes a main body having a top portion; a middle portion; and a bottom portion; a maximum outer diameter of said bottom portion of said top sleeve is greater than an outer diameter of said mid-portion of said top sleeve; said bottom sleeve including a main body having a top portion; a middle portion; and a bottom portion; a maximum outer diameter of said top portion of said bottom sleeve is less than an outer diameter of said middle portion of said bottom sleeve; said middle portion of said top sleeve having an outer diameter to enable said middle portion to pass through said top portion of said bottom sleeve; said top sleeve arranged for sliding displacement relative to said bottom sleeve; said top and bottom sleeves slidably connected together and said top sleeve moveable relative to said bottom sleeve between a fully extended and a retracted position; said bottom portion of said top sleeve having a greater outer diameter than an inner diameter of said top portion of said bottom sleeve; said top portion of said bottom sleeve and said bottom portion of said top sleeve configured to engage one another when said top sleeve has moved to said fully extended position thereby preventing said top and bottom sleeves from separating from one another.

9. The spring system as defined in claim 1, wherein a bottom portion of said top sleeve includes a variable diameter portion; a top portion of said bottom sleeve including a variable diameter portion; said variable diameter portions of said top and bottom sleeves preventing said top and bottom sleeves from separating from one another.

\* \* \* \* \*